United States Patent
Ramfelt et al.

(10) Patent No.: US 6,510,141 B1
(45) Date of Patent: Jan. 21, 2003

(54) LINK AUTO-CONFIGURATION PROTOCOL SPECIFICATION TOPOLOGY

(75) Inventors: Lars Håkan Ramfelt, Palo Alto, CA (US); Lars Markus Hidell, Lidingö (SE); Peter Olov Sjödin, Sollentuna (SE)

(73) Assignee: Dynarc Inc. DHA Dynamic Network Architecture Inc., Sunnyvale, CA (US)

(*) Notice: Subject to any disclaimer, the term of this patent is extended or adjusted under 35 U.S.C. 154(b) by 18 days.

(21) Appl. No.: 09/642,556

(22) Filed: Aug. 18, 2000

Related U.S. Application Data

(63) Continuation-in-part of application No. 09/062,524, filed on Apr. 17, 1998, now Pat. No. 6,108,338, which is a continuation-in-part of application No. 08/757,347, filed on Nov. 27, 1996, now Pat. No. 5,838,687.

(51) Int. Cl.[7] .............................................. H04L 12/28
(52) U.S. Cl. ...................................... 370/254; 370/406
(58) Field of Search ................................ 370/252, 254, 370/258, 403, 404–406, 362, 440, 438, 458, 460, 400, 280, 294, 336, 345, 347, 424, 478; 709/208, 209, 220–222

(56) References Cited

U.S. PATENT DOCUMENTS

| | | | |
|---|---|---|---|
| 4,542,502 A | 9/1985 | Levinson et al. | 370/403 |
| 4,587,651 A | 5/1986 | Nelson et al. | 370/458 |
| 5,282,199 A | 1/1994 | Herzberg et al. | 370/403 |
| 5,383,687 A | 1/1995 | Ramfelt | |
| 5,551,048 A | 8/1996 | Steely, Jr. | 395/200 |
| 5,654,969 A | 8/1997 | Wilhelmsson | 370/460 |
| 5,872,524 A * | 2/1999 | Iida | 370/254 |
| 5,914,957 A * | 6/1999 | Dean et al. | 370/362 |

OTHER PUBLICATIONS

Article: *The DTM Gigabit Network* by Christer Bohm, Per Lindgren, Lars Ramfelt, Peter Sjodin; dated Jun. 17, 1993; pp. 1–20, 22–23.

Article: *Fast Circuit Switching for the Next Generation of High Performance Networks; IEEE Journal on Selected Areas in Communications*, vol. 14, No. 2, Feb. 1996, by Christer Bohm, Markus Hidell, Per Lindgren, Lars Ramfelt, and Peter Sjödin; pp. 298–305.

Article: *Multi–gigabit networking based on DTM—A TDM medium access technique with dynamic bandwidth–allocation; Computer Networks and ISDN Systems 24 (1992) 119–130 North–Holland;* by Lars Gauffin, Lars Håkansson, and Björn Pehrson; pp. 119–130.

(List continued on next page.)

Primary Examiner—Steven Nguyen
(74) Attorney, Agent, or Firm—Fasth Law Offices Rolf Fasth

(57) ABSTRACT

The link auto-configuration protocol detects the topology of a dynamic synchronous transfer mode (DTM) architecture, detects and translates MAC addresses and negotiates configuration parameters in the DTM topology. The link auto-configuration protocol has at least three phases including a detect phase to detect information about the nodes in the network, an announcement phase to provide and negotiate configuration parameters with the nodes in the network and a commit phase to commit the nodes to the configuration parameters. The protocol may automatically switch between ring and bus topology configurations.

7 Claims, 11 Drawing Sheets

OTHER PUBLICATIONS

Article: *Incorporating continuation–of–message information, slot reuse, and fairness in DQDB networks;* Computer Networks and ISDN Systems 24 (*1992*) *153–169* North Holland; by Subrata Banerjee and Biswanath Mukherjee; pp. 153–169.

Article: *MetaRing—A Full–Duplex Ring with Fairness and Spatial Reuse; IEEE Transactions on Communications*, vol. 41, No. 1, Jan. 1993; by Israel Cidon and Yoram Ofek; pp. 110–120.

Article: *A Simple Scheme for Slot Reuse Without Latency for a Dual Bus Configuration*; by Oran Sharon and Adrian Segall, 1993 IEEE, 9 pages.

Article: *A Study of Slot Reuse in Dual Bus Multiple Access Networks* by Mark W. Garrett and San–Qi Li; 1990 IEEE, pp. 617–629.

Article: *L. Ramfelt*; by Manoel A. Rodrigues, AT&T Bell Laboratories, Holmdel, NJ 07733; 1990 IEEE; pp. 636–643.

* cited by examiner

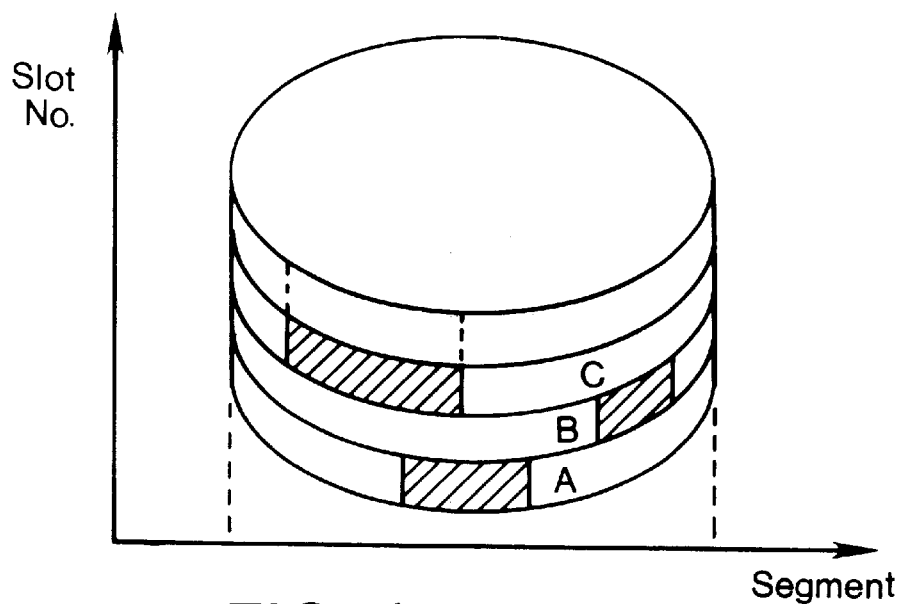
FIG. 4
FIG. 5
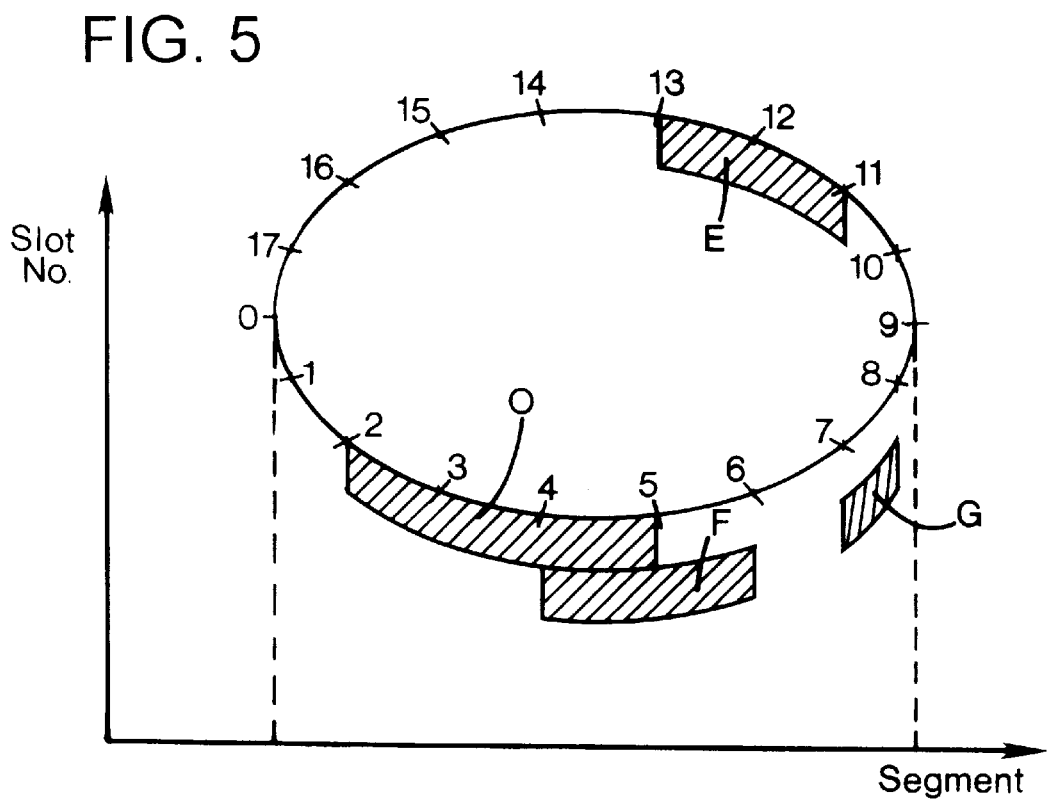

LINK AUTO-CONFIGURATION PROTOCOL SPECIFICATION TOPOLOGY

PRIOR APPLICATION

This application is a continuation-in-part application of U.S. patent application Ser. No. 09/062,524, filed Apr. 17, 1998, now U.S. Pat. No. 6,108,338; which is a continuation-in-part application of U.S. patent application Ser. No. 08/757,347, filed Nov. 27, 1996, now U.S. Pat. No. 5,838,687.

TECHNICAL FIELD

The present invention relates to a protocol that, among other things, detects the topology of a dynamic synchronous transfer mode (DTM) architecture, detects and translates MAC addresses; and negotiates configuration parameters in the DTM topology.

BACKGROUND AND SUMMARY OF THE INVENTION

The next generation of networks are likely to integrate services such as delay-insensitive asynchronous applications including fax, mail, and file transfer with delay-sensitive applications having real-time requirements including audio and video. These applications have traditionally been supported by different network technologies and the integration between the different networks have been limited and cumbersome. In the past, asynchronous communication has been provided by computer networks that are packet-switched and use store-and-forward techniques, such as the Internet. Real-time synchronous communication, on the other hand, has been provided by circuit switched, time-division multiplexed telephone networks.

Circuit-switched networks have many attractive features. For example, the circuits may be isolated from one another in the sense that traffic on one circuit may be unaffected by activities on the other circuits. This makes it possible to provide guaranteed transfer quality with constant delay which often is suitable for applications with timing requirements. Furthermore, information that is related to data and control are separated in circuit-switched networks. Processing of control information only takes place when circuits are created or terminated and the actual data transfer can be performed without the need for processing the data stream and controlling any congestion. This allows large volumes of data to be transferred efficiently.

The static nature of ordinary circuit-switched networks often makes them inappropriate for certain types of information flows. Traditionally, the circuits have fixed capacity, long set-up delay and poor support for multi-cast communication. These shortcomings make it difficult to efficiently support, for example, computer communication in a circuit-switched network. This has motivated a search for alternative solutions and the predominant view is that the next generation of telecommunication networks should be cell-switched based on asynchronous transfer mode (ATM). The cells are small, fixed-size packets, so ATM is similar to packet-switching. This means that many of the weaknesses of packet-switching are also present in cell-switched networks, particularly in the area of providing guaranteed quality of service. Therefore, additional mechanisms, such as admission control, traffic regulation, scheduling of packets on links and resynchronization at the receiver are needed to integrate support for different kinds of information flows. One of the main concerns with packet and cell switched networks in general, and ATM in particular, is whether it is possible to provide and use these mechanisms in a cost-effective way.

Shared medium local area networks (LANs), such as CSMA/CD, token ring and FDDI, are used in the Internet as building blocks connected by routers or bridges. The combination of easy expansion, low incremental node cost and tolerance to faulty nodes has resulted in simple, flexible, and robust networks. Also, the shared medium facilitates an efficient application of new multi-cast protocols such as IP multi-cast.

A drawback of the shared medium that is used today is that it typically permits only a single terminal to transmit at any time, thereby not utilizing all network segments efficiently. A design that allows the capacity of the medium to be reused may be designed, but this is often at the cost of increased complexity in the high-speed access control hardware. Access control mechanisms for a shared medium also directly depend on the size of the network and are usually efficient only for local area environments.

As indicated earlier, the two main types of networks commonly used are connection oriented circuit-switched networks used for telephones and packet-switched networks without connections that are used for computers, as exemplified by the Internet. When a circuit-switched network is used for data communication, the circuits must remain open between bursts of information which is often a poor use of the network capacity. This problem arises because circuit management operations are slow compared to the dynamic variations in the user demand. Another source of overhead in conventional circuit-switched networks is the limitation of requiring symmetrical duplex channels which may add 100% overhead to the network when the information flow is unidirectional. This constraint also makes multi-cast circuits inefficient and difficult to implement. Packet-switched networks, on the other hand, lack resource reservation and must add header information to each message before the transmission is made. Furthermore, any latency in the packet-switched networks cannot be accurately predicted and packets may even be lost due to buffer overflow or corrupted headers. The latter two factors make real-time service difficult to support in packet-switched networks. Congestion avoidance mechanisms can isolate information streams of different users. These designs are, however, limited to time scale operations that are comparable to the round-trip packet delay.

DTM is a broadband network architecture that combines many of the advantages of circuit-switching and packet-switching in that DTM is based on fast circuit-switching augmented with a dynamic reallocation of resources, good support for multi-cast channels and DTM has means for providing short access delay. The DTM architecture spans from medium access, including a synchronization scheme, up to routing and addressing of logical ports at the receiver. DTM is designed to support various types of information flows and can be used directly for application-to-application communication, or as a carrier network for other protocols such as ATM or IP (the Internet Protocol).

It has been shown that the signaling delay associated with the creation and termination of communication channels determines much of the efficiency of fast circuit-switching. DTM is designed to create channels fast, within a few hundreds of microseconds. DTM differs from burst switching in that information related to control and data are separated and DTM uses multi-cast, multi-rate, high capacity channels to support a variety of different classes of information flows. For example, it is possible to increase or decrease the allocated resources of an existing channel depending on the particular requirements of the user at the time. Even though a DTM network may have the potential of creating a channel for every message, this approach may not be suitable for all information flows. Rather, it is up to the user to decide whether to establish a channel per information burst or to keep the channel established even during idle periods.

The DTM concept may use channels as the communication abstraction. The DTM channels differ from telephone circuits in many ways. First, the establishment delay is short so that resources can be allocated/deallocated dynamically as fast as user requirements change. Second, the DTM channels are simplex to minimize the overhead when the communication is unidirectional. Third, the DTM channels offer multiple bit-rates to support large variations in user capacity requirements. Finally, the DTM channels are multicast to allow any number of destinations.

The DTM channels require no transfer of control information after a channel is established resulting in a very high utilization of network resources for large data transfers. The support of any real-time information flow is effective and there is no problems related to policing, congestion control or flow-control within the network. As mentioned earlier, the control information is separated from the data information which makes multi-cast less complex. The transmission delay is negligible (i.e., less than 125 $\mu s$) and there is virtually no potential for data loss caused by buffer overflow as in ATM. Bit-error rates depend on the underlying link technologies, and switches are simple and fast due to the strict reservation of resources at the channel setup.

The DTM topology may be structured as a ring which has the advantage of reducing the hardware requirement with 50% compared to dual bus structures. All nodes are able to communicate with each other on a ring topology by using only one fiber optic in contrast to a bus structure that always require at least two fibers in opposite direction to enable all the nodes to communicate with each other.

More particularly, the present invention is a link auto-configuration protocol that detects the topology of a dynamic synchronous transfer mode (DTM) architecture, detects and translates MAC addresses and negotiates configuration parameters in the DTM topology. The link auto-configuration protocol has at least three phases including a detect phase to detect information about the nodes on the network, an announcement phase to provide and negotiate configuration parameters with the nodes in the network and a commit phase to commit the nodes to the configuration parameters. The protocol may automatically s witch between ring and bus topology configurations.

BRIEF DESCRIPTION OF THE DRAWINGS

FIG. 4 is a schematic view of a ring topology showing three separate channels;

FIG. 5 is a schematic view of the DTM ring topology of the present invention showing slot reuse of different segments;

DETAILED DESCRIPTION

Figure 1:
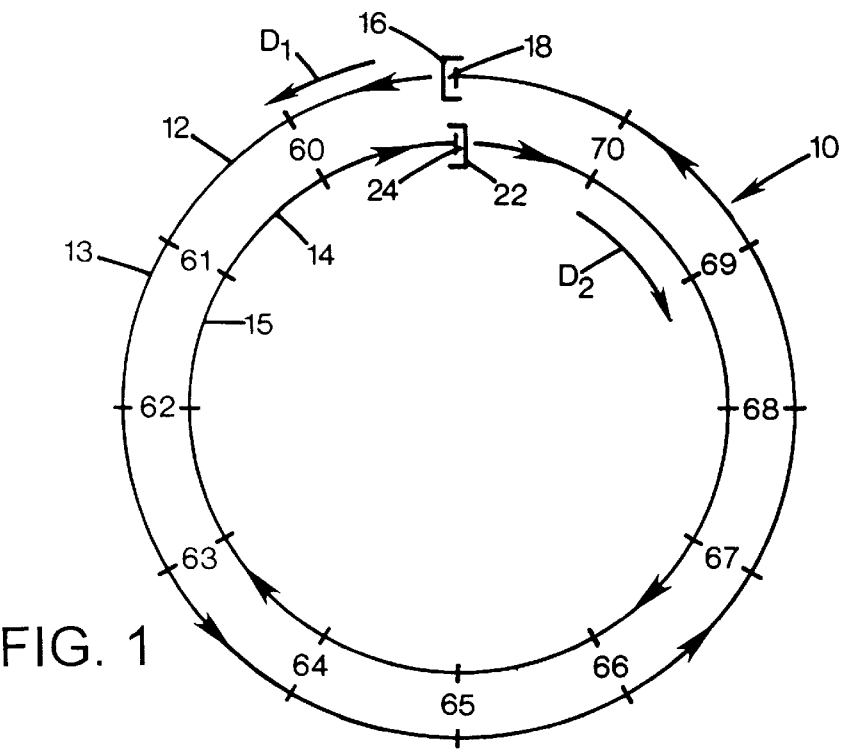
FIG. 1 is a schematic view of a dual DTM ring topology of the present invention.
Figure 2:
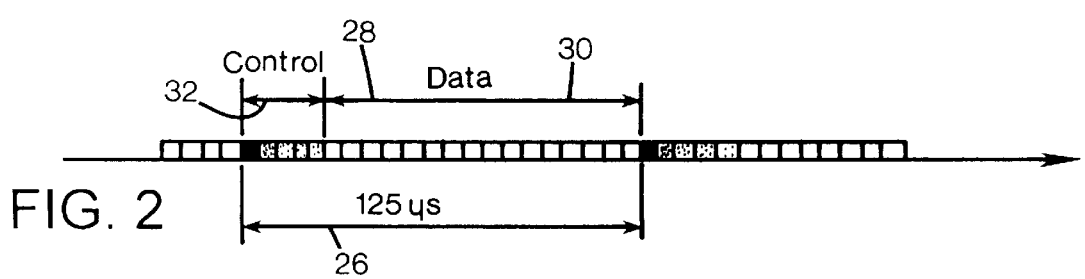
FIG. 2 is a schematic view of a DTM cycle of the present invention having the data time slots separated from the control time slots.

With reference to FIGS. 1–2, the present invention is a dynamic synchronous transfer mode (DTM) ring topology system 10 having a first ring topology 12 and a second ring topology 14. The total capacity of the ring topologies 12, 14 may be divided into cycles of 125 microseconds which are further dividable into 64-bit slots.

One feature of the DTM ring topologies 12, 14 is that the cycle time and the slot length are, preferably, constant throughout the DTM ring topologies 12, 14. The DTM ring topologies 12, 14 are designed for a unidirectional medium with multiple access such as fiber optics medium 13, 15 having a capacity that is shared by all the connected nodes. The slots may be dynamically allocated between the nodes, as required.

The first ring topology 12 is adapted to transfer data in a first rotational direction, as shown by an arrow D1, such as in a counter-clockwise direction, and the second ring topology 14 is adapted to transfer data in a second rotational direction, as shown by an arrow D2, such as in a clockwise direction. It is to be understood that the first rotational direction may be clockwise and the second rotational direction may be counter-clockwise as long as the first fiber direction is different from the second fiber direction. Both the first and second ring topologies 12, 14, preferably, have an effective length that is an integer multiple of 125 microseconds long cycles. As described in detail below, although the actual length of the ring topologies is not an integer multiple of 125 microseconds, the effective length of the ring topologies may be adjusted with expansion nodes The first ring topology 12 may comprise an expansion node 16 that may be used to precisely adjust the effective length of the ring topology 12 although the physical length of the ring topology 12 is not an integer multiple of the cycle time. The expansion node 16 may include an expandable buffer segment such as a FIFO (first-in-first-out) queue 18 for storing incoming cycles or frames of time slots. The queue 18 permits a time expansion of the first ring topology 12 to store incoming cycles in the queue 18 a suitable amount of time to optimize the use of the expansion node 16 by permitting the expansion node 16 to generate cycles periodically (every 125 microseconds) into the ring topology independent of the availability of any incoming cycles in the FIFO queue 18 at the transmission time of the new cycle.

The first ring topology 12 preferably has a plurality of nodes 60–70 and at least one of the nodes is selected as the expansion node 16. The method of selecting the expansion node 16 may be performed according to a suitable selection method such as selecting the node that has the highest or the lowest predetermined identification number.

Similarly, the second ring topology 14 preferably comprises an expansion node 22 that may be used to precisely adjust the effective length of the second ring topology 14. The expansion node 22 may include an expandable FIFO queue 24 to optimize the use of the expansion node 22 and to properly synchronize the incoming cycles or frames in the expansion node 22. The second ring topology 14 preferably shares the nodes with the first ring topology 12 although the fiber direction of the second ring topology 14 is opposite that of the fiber direction of the first ring topology 12.

Figure 3:
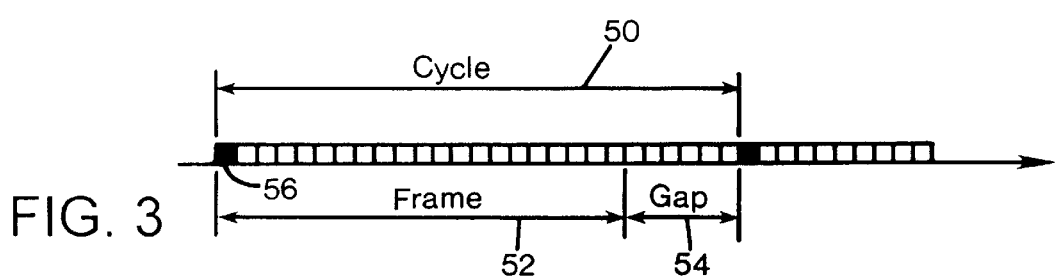
FIG. 3 is a schematic view of a DTM cycle including a frame and gap slots.

FIG. 3 illustrates the details of a complete time cycle 50 that may be defined as an integer number of time slots corresponding to about 125 microseconds. The cycle 50 may be divided into a frame 52 and gap slots 54. The frame 52 may be used to include data slots for carrying pay loads and control slots for carrying control and management messages. It is necessary to include the gap slots 54 in each cycle 50 because each node in the ring topology 10 may not be perfectly synchronized to 125 microseconds and the gap slots 54 may be used to accommodate any variations between the nodes. The gap slots 54 are preferably never used to carry payloads but are only used as an adjustment mechanism. The number of gap slots 54 may be adjusted up or down a few slots so that the average cycle time is very close to 125 microseconds.

In the preferred embodiment, the frame 52 may also include a start slot 56 that is disposed in the beginning of the frame 52 to define the start of a new cycle. In this way, the frame 52 is a fixed number of slots that is slightly less than the total number of slots in the cycle 50.

In general, the service provided by the DTM ring topologies 12, 14 of the present invention are, preferably, based on channels. A channel may be defined as a set of time slots having a sender and an arbitrary number of receivers. The result is that it is guaranteed that the data will reach the receivers at the rate given by the capacity of the channel. The channels on the physically shared medium may be illustrated by a time division multiplexing (TDM) scheme (see FIG. 2). The total capacity of the shared medium may be divided into cycles 26 having a length of 125 microseconds which are further divided into 64-bit slots 28. It is to be understood that other cycles and slot sizes may be used. The transmission medium can, in addition to optical fibers, be a coaxial cable or another medium with high capacity. In the description, the transmission medium will be referred to as an optical fiber.

The time slots are preferably separated into data slots 30 and control slots 32. As described in detail below, each node 60–70 has access to at least one control slot 32 associated therewith that may be used for sending control information to the other nodes in the network. For example, control messages may be sent upon a request from a user and in response to control messages from other nodes or simultaneously for management purposes. The control slots 32 may constitute a small fraction of the total capacity while the major part of the slots are, preferably, data slots 30 for carrying payload information.

All the connected nodes 60–70 and the expansion nodes 16, 22 in the ring topologies 12, 14 share all the available data slots. An important feature of the DTM concept is the time division multiplexing scheme illustrated in FIG. 2. The position of a particular set of slots in the cycles may be used to determine which of the nodes have access to the particular set of slots. In other words, a data slot is always owned by exactly one node at a particular time and only the owner of a data slot at a particular time may use the data slot to send information on a specific segment. If slot reuse is used, then the same slot may be used simultaneously by more than one user but on different segments of the ring topologies 12, 14.

However, a node may dynamically allocate resources to another node in the ring topologies such as by dynamically allocating a data slot or a set of data slots to another node if the other node needs more slots to fulfill a request. In this way, the ownership of the data slots may vary and is negotiated by the nodes through the control slots 32. In each network node there may be a node controller that controls the access to the data slots and performs network management operations, such as network start-up and error recovery. The main tasks of the node controller are to create and terminate channels on demand from users and to manage network resources in response to user requests. Preferably, control slots are used exclusively for messages between node controllers. As mentioned earlier, each node controller has write access to at least one control slot in each cycle which it uses to broadcast control messages to down-streams nodes. Since write access to control slots is exclusive, the node controller always has access to its control slots regardless of other nodes and network load. The number of control slots a node uses may dynamically vary during network operation.

As mentioned earlier, the majority of the slots in a cycle are data slots. Access to data slots may change over time depending on the requirements of the users connected to the nodes in the ring topologies. Write access to the slots may be controlled by slot tokens (or tokens for short). A node controller may write data into a slot only if it owns the corresponding token. The token protocol guarantees the slot access to be conflict free, which means that not more than one node writes data into the same slot for a specific segment.

Status messages may be used to distribute information about the pool of free tokens available among the nodes in the network. Status message information may be used to assist a node to choose a suitable node when requesting for more resources such as more slots. In this way, each node may regularly broadcasts status information about how many free tokens the node has. The other nodes may store this information in their status tables. A node that requires more capacity may consult its status table to decide from which node to request more slots. The broadcast status information provides an approximate view of the current state of token information so that token requests may be rejected because they were sent to nodes that no longer have tokens to give away.

The DTM system of the present invention permits a multiple access to the data slots depending upon which node has been allocated the slots according to the allocation system used in the network. In this way, the position of the slots in the cycle may be used to determine which node is going to use the data slots and there is no need to include a header in the message.

According to the DTM protocol, when the expansion nodes 16, 22 and nodes 60–70 in the ring topologies 12, 14 read the slots of a frame transmitted by or received from a preceding node, including the expansion nodes 16, 22, the nodes may either copy the information of the slots and send the information to the local user of the particular node and transmit the same information to the next node in the ring topologies 12, 14. If a slot reuse method is used, the nodes 60–70 may also read and copy the information of the slots and send the copied information to the local user and then change the information or write new information into the slots before the frame is forwarded to the next node. Of course, the nodes may neither read or copy the information of a particular node.

As noted above, one important feature of the present invention is that the cycle time is preferably constant to maintain the synchronization of the entire ring topology system 10. Additionally, each cycle has a constant number of slots although each slot in every cycle may or may not contain any information. It is also important to note that it is possible to increase the bit rate per seconds in the fiber optics 13, 15 thereby increasing the number of slots per cycle without losing the synchronization of the ring topologies 12, 14 of the network. It is even possible to connect the ring topology system 10 to another network that runs at a different speed and the synchronization may be maintained if the cycle time and slot length are constant.

If a slot reuse method is used, a single slot may be used multiple times on the ring topologies. Slot reuse enables simultaneous transmissions in the same slot over disjoint segments of the ring topologies 12, 14. Slot reuse may be described as a general method to better utilize shared links in the ring topologies 12, 14.

To allow slot reuse in DTM, the block token format may be extended to include parameters describing the segments it is representing. The token management protocol may also be modified to avoid conflicts in the slot number dimension as well as the segment dimension.

The fact that the first DTM ring topology 12 has a fiber direction that is opposite the fiber direction of the second DTM ring topology 14 improves the capacity of the ring topology system 10. The capacity of the system depends partly on the bit rate per second of the particular fiber optics used. For example, the bit rate per second may be a fixed value such as 1 billion bits per second. Of course, the bit rate per second may be a higher value or a lower value. The higher the bit rate of the fiber optics the more slots per 125 microseconds cycle. As explained in detail below, the actual throughput of the ring topology system 10 may be higher than the bit rate of the fiber optics 13, 15 by reusing slots in the ring topologies 12, 14 in certain segments of the ring topologies. In other words, the same slots may be used by different users in different segments of the ring topologies so that a slot may be used more than once. However, the number of slots per cycle does not increase only the number of times the slots are used to send frames if the number of slots required by the messages or channels exceeds the number of slots in the cycle.

Assuming that both the ring topologies 12, 14 have the same fiber direction, the total capacity of the system 10 is the bit rate of ring topology 12 in addition to the bit rate of the ring topology 14, i.e., the total bit rate is double the bit rate of only one of the ring topologies.

By providing the ring topologies 12, 14 with fiber directions that are opposite to one another, the average distance a frame must travel from a source node to a destination node is reduced to half the average distance of a single ring topology 12. The average travel distance in a single ring topology or a dual ring topology, with the same fiber direction, is half the ring circumference while the average travel distance in a dual ring topology having opposite fiber directions is only one quarter of the ring circumference. By reducing the average distance, the total capacity of dual rings with opposite fiber direction is twice as high as the total capacity of a dual ring where both rings have the same fiber direction.

In this way, a ring topology doubles the capacity compared to a dual bus topology because any source node can reach any destination node. In contrast, a bus topology requires at least two buses, one in each direction, to enable any source node to reach any destination node in the bus topology. A dual ring topology having the same fiber direction doubles the capacity compared to a single ring topology. A dual ring topology with opposite fiber directions doubles the capacity compared to a dual ring topology with the same fiber direction. Therefore, the total capacity of a dual ring topology having opposite fiber directions is eight times higher than a conventional bus topology.

In the dual ring topology system 10 of the present invention, a source node may select the shortest way to a destination node by using the identification number of each node. For example, the shortest way from the source node 61, as shown in FIG. 1, to the destination node 69 is in the clockwise D2 and requires the involvement of at least 4 nodes before reaching the destination node 69 by using the ring topology 14. As indicated above, information may either be transmitted in a clockwise or counter-clockwise direction. The shortest way may be calculated as the smallest value of: a) the chronological number of the destination node (69) minus the chronological number of the source node (61) which equals 8; and b) chronological number of the source node (61) plus the total number of nodes in the ring topology (12) minus the chronological number of the destination node (69) which equals 4. Because 4 is lower than 8, the message will be sent in the D2 direction because that is the shortest way.

As mentioned above, the expansion node 12 or any other node 14 in the ring topology 10 may create a channel by allocating a set of data slots for the channel to each node and by sending a channel establishment control message. The control message may be addressed either to a single node or to a multi-cast group and announces that the channel has been created and what slots are used.

A traditional circuit is often a point-to-point connection between a sender and a receiver. DTM, on the other hand, uses a shared medium which inherently supports multi-cast since a slot can be read by several nodes in a ring topology.

Access delay is the average time from the time that a request arrives to the node until the data transfer starts. It is a measure of the overhead of the channel establishment and includes the time it takes to allocate slots, send a channel establishment message to the receiver and send the first slot of data. In the multi-hop case, the sender waits for a confirmation from the receiver that the channel has been established on both ring topologies before it starts sending data. For the single hop case, the sender alone may create the channel to the receiver and can therefore start sending data as soon as the slots have been allocated.

The access delay consists, when there is a low load condition, mainly of the time it takes for a node to process the transfer request, waiting time for the first available control slot (for the channel establishment message) and then for the first data slot. When the load increases, the nodes have to request slots from other nodes and more delay may be introduced.

Control messages for the channel establishment and bandwidth reallocation may carry sets of tokens as parameters. However, a control message is, preferably, 64 bits and can therefore have only a small number of parameters. This means that if a user requests a large bandwidth transfer, it may be necessary to send several control messages to create the channel. This may introduce extra access delay and consumes signaling capacity. Several mechanisms have been considered to decrease the amount of information that needs to be sent during the channel creation and token reallocation. The first optimization in token management is to introduce block tokens. A block token may be transferred in a single control message and represents a group of tokens, but can only be used for particular combinations of tokens. For instance, a block token may be denoted by a slot number and an offset giving the number of contiguous slots in the group. The block token optimization assumes that the token pool is not fragmented into small pieces. An amount of small token blocks in the free pool may be a problem and will be referred to as fragmentation.

The token protocol guarantees that a data slot can never be used by two nodes simultaneously on the ring topology. Sometimes this protocol is too conservative. FIG. 4 shows an example of how three tokens (A, B, and C) are reserved for three channels. The nodes are connected by segments and channels typically use a subset of the segments on the ring structure (gray color) and the rest are reserved (white color) but left unused and thus wasting shared resources. A better alternative is to let the channels only reserve capacity on the segments between the sender and the receiver as the example illustrated in FIG. 5. A single slot may in this case be used multiple times on the ring topology. Channel D is using the same slots as channel E but on different segments. Similarly, channel F and channel G use the same slots but on different segments. This is referred to as slot reuse. Slot reuse enables simultaneous transmissions in the same slot over disjointed segments of the ring topology. Because the ring topology is round, it is also possible to reserve slots from the end segments to the start segment, such as from segment 16 to segment 2. This is an added feature of ring structures that is not available in single or dual straight bus topologies.

There are additional factors that may influence the utilization in DTM topologies. First, each node is assigned signaling capacity in the form of control slots, which means that there are fewer slots available for data transfer on a ring with many nodes, given a fixed link capacity. Secondly, token reallocation may incur overhead since while a slot token is being reallocated between nodes, the corresponding slot cannot be used for data transfer.

Figure 6:
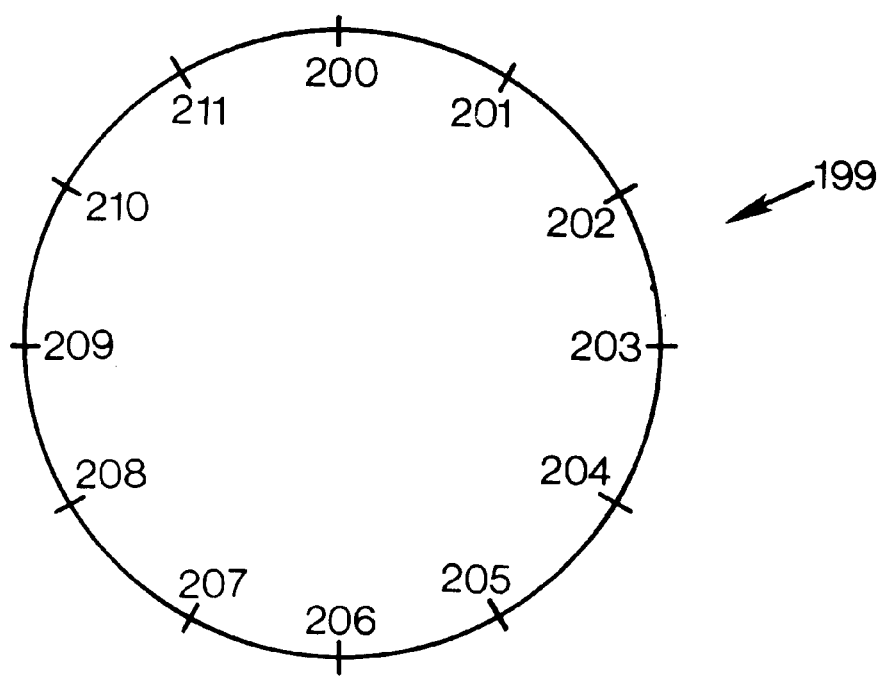
FIG. 6 is a schematic view of a ring topology.

FIG. 6 is a schematic view of a DTM link 199 in the form of a ring topology that includes a link auto-configuration protocol (LAP) that runs on all nodes 200–211 connected to the DTM link 199. As described in more detail below, LAP is also suitable for other topologies such as bus topologies. The main functions of the LAP may include topology detection, MAC address detection and translation, and configuration parameter negotiation.

The LAP may be triggered or executed, for example, when a link is initiated, when there is a change in topology, and when there is a change in configuration by network management.

Most basic slot management functions in DTM require that all nodes on a link know the topology of the link and have the same view of the link topology. The link topology may refer to the number of nodes on the link (i.e., link size) and the type of link (bus, ring, dual bus, etc). One function of the LAP is to find out the topology of the link and to make sure that the information about the topology is distributed to all nodes.

The LAP consists of a set of link configuration messages, which are sent over the control channel. The control channel may be a dedicated channel that runs over a pre-defined set of slots. The basic configuration is that the control channel uses slot 0. The control channel is preferably hop-by-hop, which means that the length of a control channel is one segment. In other words, there is one control channel between every pair of adjacent nodes, so every node may have one outgoing control channel (going to its downstream neighbor) and one incoming control channel (from the upstream neighbor).

On every link, there may be one node responsible for executing the LAP. This node is called the master node. The LAP may be designed for a logical ring structure where the master is responsible for inserting and removing messages on the ring topology. When a master node sends out a message on its control channel, the message may travel between the other nodes on the link and eventually reach the master node again. This happens automatically on a ring, while reverse flooding may be used on a bus, as is explained in detail below.

In a multi-link configuration the same node may be reached via multiple links. This may mean that a routing decision must be made where one of the links is chosen. The decision that can be based on shortest path, link congestion et cetera. The LAP provides support for multi-link routing by exploring multi-link topologies and collecting information about which nodes can be reached on which links.

A node on a multi-link may be identified by a DTM MAC address. Preferably, it is a requirement that all interfaces of a node belonging to the same multi-link have the same MAC address. Furthermore, the individual links in a multi-link configuration may be identified by link identifiers. For example, if a double ring topology, the inner ring may have a first link identifier and the outer ring may have a second link identifier that is different from the first link identifier. The link identifiers may be assigned by the master node on the link. The link identifiers may have the same format as the MAC addresses for each node, and the master node may use the physical MAC address of the interface connected to the link. The master node may include the link identifier in every announcement, detect and commit message the master node sends into the topology, as explained in detail below.

Messages that are sent in the DTM Control Protocol (DCP), which is a protocol that is different from the LAP, may have a 2-bit link field, called ringID. This field is used to identify the link to which the message belongs and may be thought of as a short-form version of the 48-bit link identifier of the LAP. The 48-bit link identifier enables the LAP to use link identifiers that are globally unique for the entire topology. The mapping between ringID and link identifier of the LAP may be provided by a link map. The link map may be established in similar way to the node map, through the circulation of detect and announcement messages. It should be noted that the scope of the ringID is the current link only and that the ringID is not likely to be globally unique. In other words, the same ringID may mean different things on different links. One convention that may be used is to set the ringID to equal zero when referring to the current link.

More particularly, a link (1) may be said to be known by a node (n) if (n) has received an announcement message for the link (1), or if the node (n) is the master node on the link (1). Furthermore, a link ($1_1$) may be said to be known on another link ($1_2$) if there exists some node (n) on ($1_2$) such that ($1_1$) is known by the node (n).

The master node may construct a link map containing all links known by the master node. This link map may be included in all messages that are sent by the master node. In this way, the link map may be distributed to all the nodes on the link. One consequence of this procedure is that all nodes may need to be present on all links in a multi-link configuration, which may be an undesirable limitation. To eliminate this limitation, the link map may be required to contain all links known on the link.

When a new node is to be started up on a link, the node needs to trigger the execution of the LAP in order to inform all other nodes of its presence. Moreover, if there is no master node (which would happen when the entire link starts, for example), there is a way to select a master node dynamically. These two functions are achieved through the use of explore control messages.

A node that has just started to become active may send an explore message on its control channel and then enters the exploration phase. The explore message is forwarded on the topology until the explore message reaches the master node. The master node, upon reception of the explore message, removes it from the topology and initiates the LAP, which may be used to introduce the new node to the other nodes on the ring or bus topology.

Figure 7:
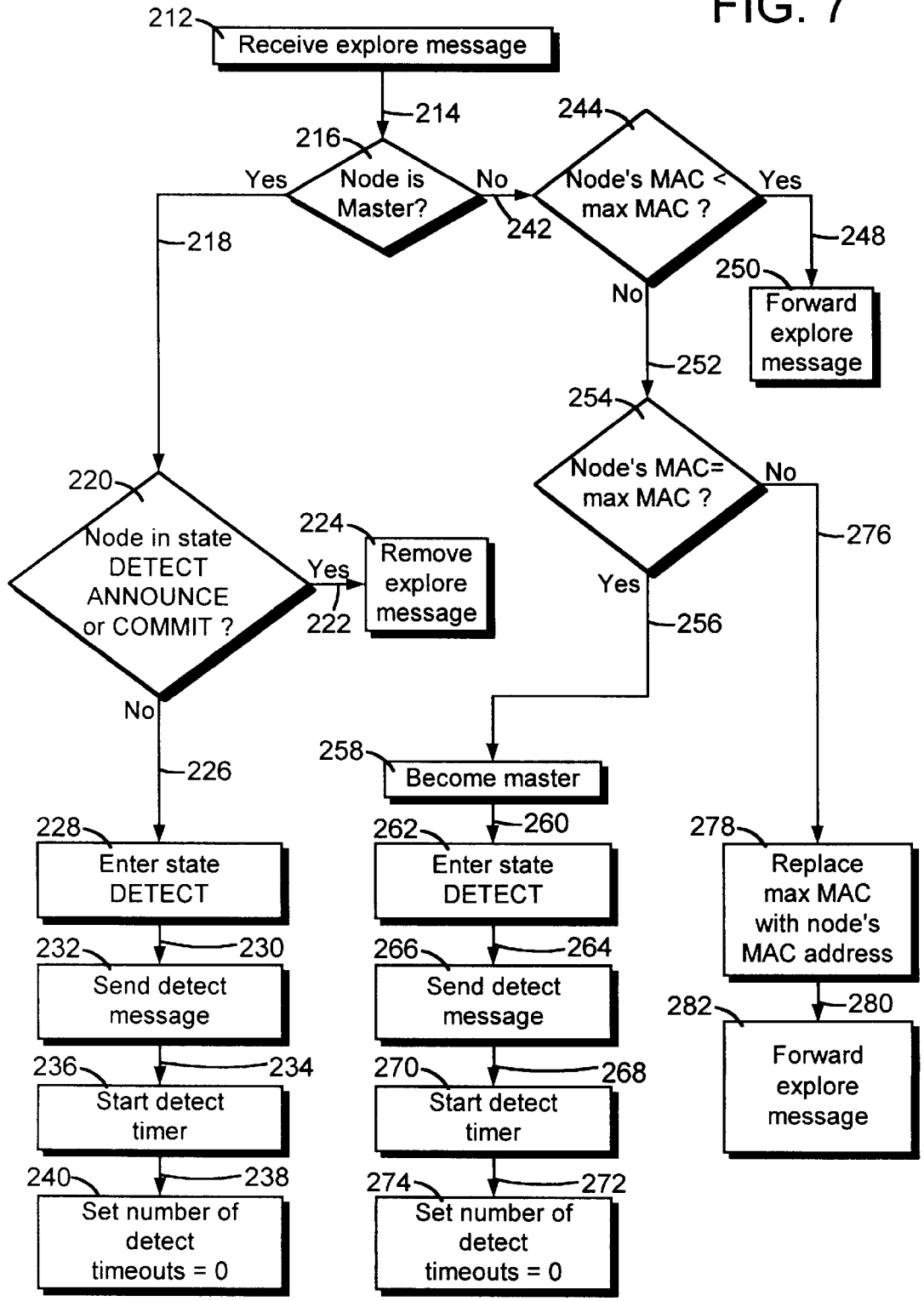
FIG. 7 is a schematic flow diagram for receiving an explore message.

FIG. 7 illustrates the process when a node receives an explore message from an explore sending unit 212. A comparison signal 214 is sent to a comparison unit 216 that determines if the node that received the explore message from the unit 212 is a master node or not. This may be determined by comparing the master node's MAC address with a maximum MAC address, as is explained in detail below.

If the node is a master node, a yes-signal 218 is sent by the comparison unit 216 to a state comparison unit 220 that determines the state of the master node. If the master node is either in state DETECT, ANNOUNCE or COMMIT then a yes-signal 222 is sent by the unit 220 to an ignore unit 224 that ignores the explore message 212 and removes the explore message from the system. The reason for ignoring the explore message is that the master node is already performing the tasks, such as sending detect messages, that the explore message is requesting the master node to do so the explore message is superfluous.

As indicated below, LAP includes at least the three states DETECT, ANNOUNCE and COMMIT. If the master node is not in state DETECT, ANNOUNCE or COMMIT, then a no-signal 226 is sent to a state change unit 228 so that the master node may enter state DETECT and perform the tasks requested in the explore message 212. The unit 228 sends a trigger signal 230 to a detect message unit 232 that transmits a detect message into the topology. One function of the detect message may be to, for example, introduce the new node that sent the explore message 212, to the other nodes in the topology. The unit 232 sends a start signal 234 to a timer 236 that starts the timer of the detection procedure. The timer 236 sends a set signal 238 to a set unit 240 that sets the number of timeouts to equal zero.

If the comparison unit 216 determines that the node is not a master node, then a no-signal 242 is sent to a max comparison unit 244. If there is no master on the ring, which could happen if the ring has just started or if the master node has disappeared, a new master should be selected. The general mechanism for doing this may be to analyze the field in the explore message 212 which contains the MAC address of the node that initiated the message. A node that receives an explore message, and is in the exploration phase, may examine the MAC address field of the explore message and compare it to its own MAC address.

More specifically, comparison unit 244 compares the node's MAC address to a max MAC address stored therein. If the node's MAC address is less than the max MAC address then a yes-signal 248 to a forwarding unit 250 that forwards the explore message 212 to the next node in the topology where the same comparison will take place until the master node is identified.

If the node's MAC address is not less than the max MAC address then a no-signal 252 is sent to a comparison unit 254 that compares whether the node's MAC address is identical to the max MAC address. If the node's MAC address is identical to the max MAC address, the unit 254 sends a yes-signal 256 to a transformation unit 258 so that the node becomes the master node. The newly created master node sends a state change signal 260 to a state change unit 262 so that the state of the master node may enter state DETECT. The unit 262 sends a trigger signal 264 to a detect message unit 266 that transmits a detect message into the topology. The unit 266 sends a start signal 268 to a timer 270 that starts the timer of the detection procedure. The timer 270 sends a set signal 272 to a set unit 274 that sets the number of detect timeouts to equal zero.

If the comparison unit 254 determines that the node's MAC address is not equal then a no-signal 276 is sent to a replace unit 278 that replaces the max MAC address with the node's MAC address and sends a forward signal 280 to a forwarding unit 282 that forwards the explore message 212 to the next node. This procedure continues until the comparison unit 254 determines that a node's MAC address is equal to the max MAC address so that node may become the master node of the topology.

Figure 8:
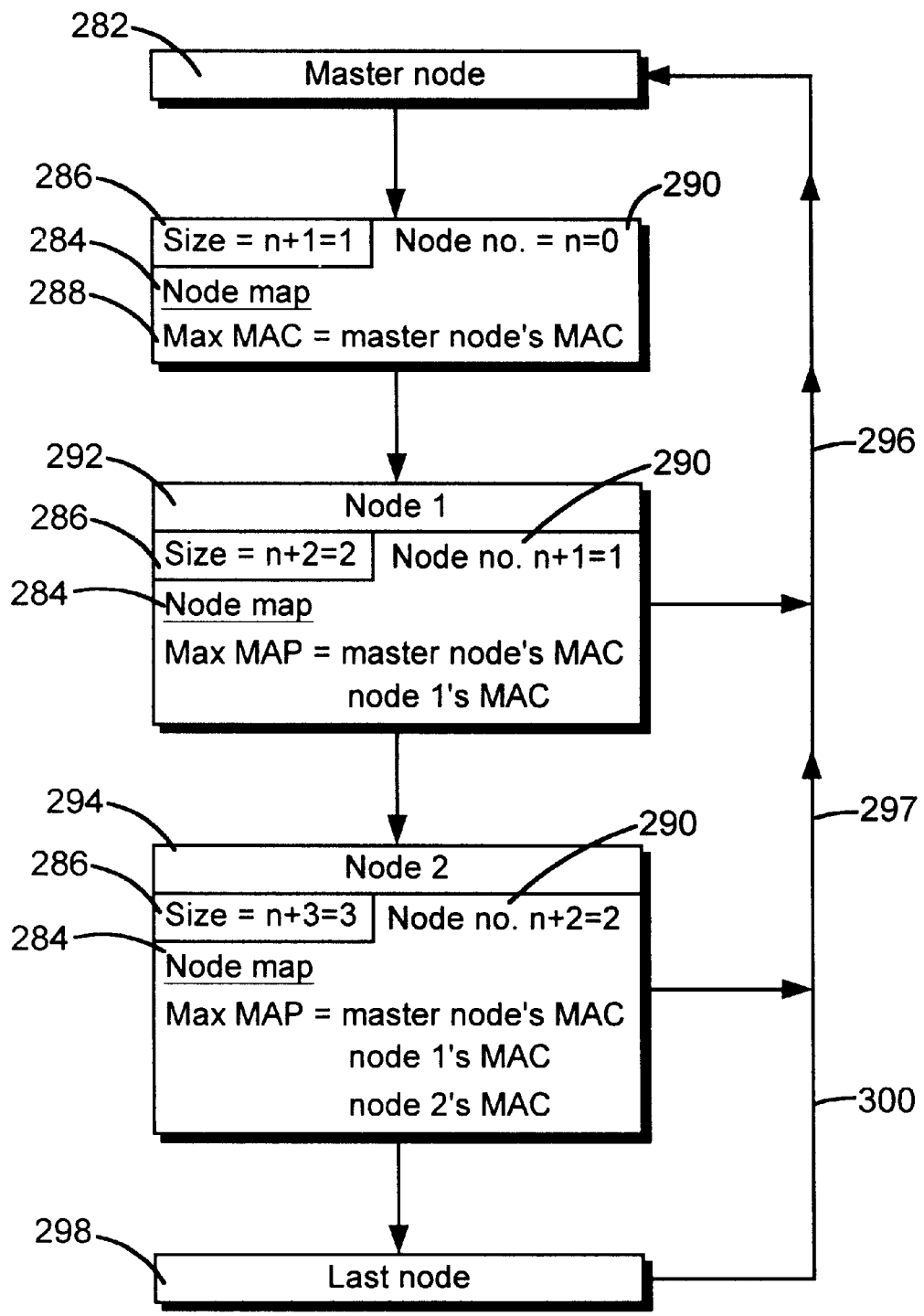
FIG. 8 is a schematic flow diagram for detecting a bus topology.

FIG. 8 is a schematic view of the procedure for a master node 282 when sending a detect message 284 in a dual bus structure. The LAP does not go into the detect phase until a master node has been found. As indicated above, the LAP collects and propagates the MAC addresses of all nodes on a link and the information is stored in a node map. This is an optimization to support efficient routing on a multi-interface link and to reduce the amount of control signalling during the operation of the link.

As mentioned above, the LAP basically consists of the three phases, detect, announce and commit, and the master node 282 is responsible for initiating each phase. In the first phase after the exploration synchronization is complete, the master node 282 initiates the LAP by sending the detect message 284 on its outgoing control channel. The detect message 284 has a size field 286, indicating how many nodes there are on the topology, and a node map 288, which is a data structure with variable size fields with the MAC addresses and the relative positions (node numbers 290) of the nodes. The node map 288 may provide a mapping from a MAC address to a set of link identifier and node number pairs. A link routing operation involves obtaining the node map for the source node, and selecting the most suitable link identifier and node number pair to reach the desired destination. The node map 288 may be created through detect/announcement messages, as outlined below. Every node preferably appends its node number 290 and MAC address to the node map 288 at the end of the detect message. When the detect message reaches the master node 282, the message contains the part of the node map 288 that concerns that link. The announcement message then distributes the partial node map to all nodes The node map is partial because the master node has only received information from one link. When the master node has received node maps on all links in a multi-link, the master node can construct the complete node map for that multi-link.

The initial detect message that is sent by the master node 282 has size one, and the node map 288 with one entry containing the MAC address of the master node and node number zero since the node number 290 starts at zero, with the master node as the first node.

When the node 292 downstream from the master node 282 receives the detect message 284, the node 292 increases the size field 286 by one, and appends its own MAC address and node number 290 to the node map 288. Since the node numbering starts at the master node 282, the node 292 can obtain its node number 290 directly from the size field 286. Finally, the node 292 forwards the detect message 284 onto the outgoing control channel to be forwarded to the node 294 that performs the same routine as the node 292.

In this way, every node in the topology mastered by the master node 282 may update and forward the detect message 284 that the nodes receive. Therefore, when the detect message 284 reaches the master node 282, the message 284 will contain the current size 286 of the link, and the node mapping 288 between MAC addresses and node numbers 290 for all nodes on the link. Then the master node 282 has all the information about the current link topology.

On a bus topology, the node 292 that receives the detect message 284 should both forward the message 284 downstream to the node 294 and perform reverse flooding by sending a reverse flooding detect signal 296 back to the master node 282. Similarly, the node 294 also sends back a reverse flooding detect signal 297 to the master node 282. The reason for this is that during the detection phase, the topology is not yet known to the master node 282 and therefore all possible configurations need to be covered. When a last node 298 on the bus topology receives the message 284 then the node 298 should only transmit a reverse flooding detect signal 300 back to the master node 282 since the is no node to forward the message 284 to. Otherwise, the detect message 284 should be sent to the downstream node.

As a result of the reverse flooding detect signals, the master node 282 will receive multiple reverse flooding detect signals from the nodes on the bus topology. The master node 282 preferably only processes the reverse flooding detect signal 300 that is sent from the last node 298 on the bus topology. This determination may be made by the master node 282 through a deferred detect processing routine.

Figure 9:
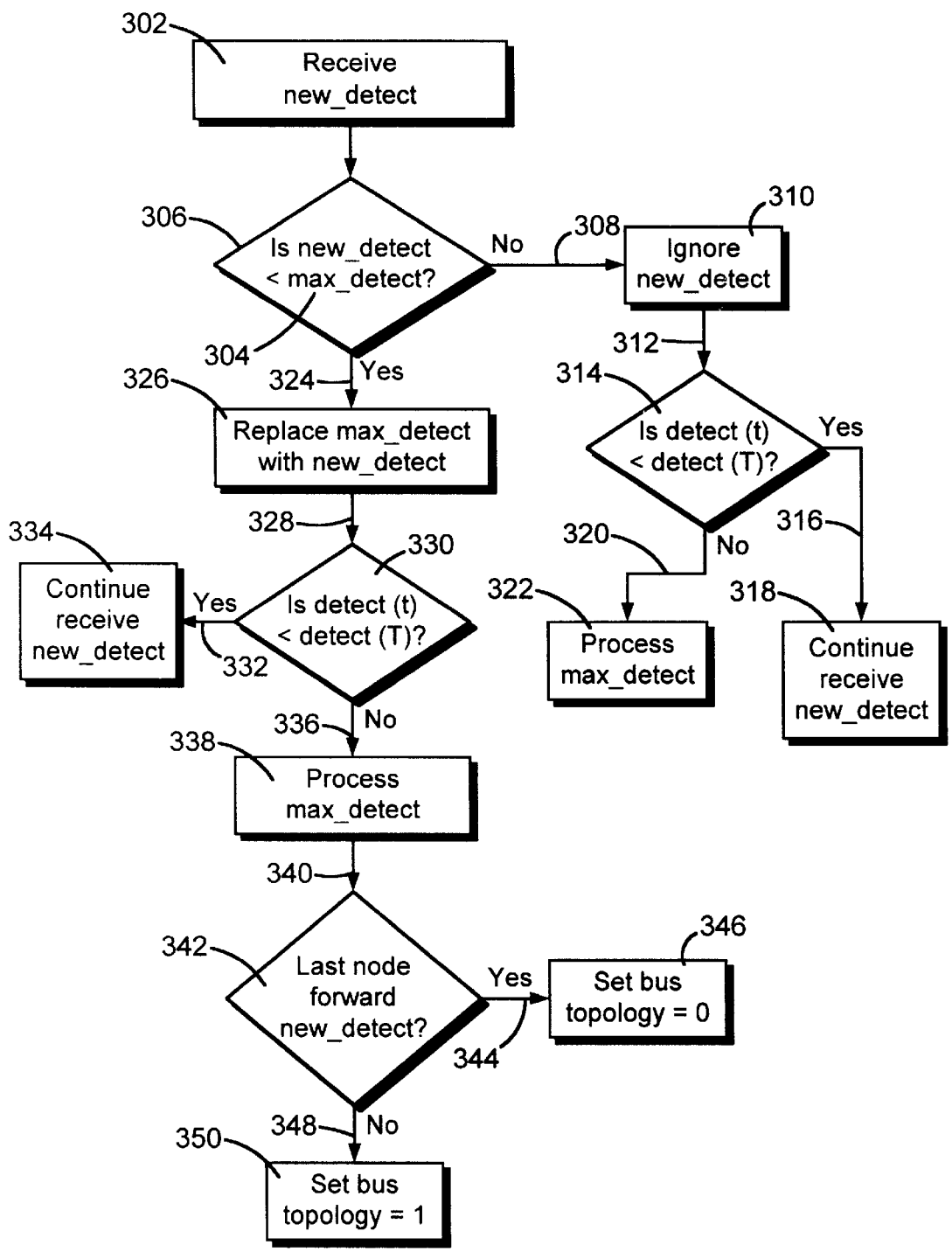
FIG. 9 is a schematic flow diagram for updating a bus topology.

FIG. 9 illustrates the process when the master node 282 receives a reverse flooding detect signal called new_detect 302. The LAP is designed to support any combination of bus and ring configurations. There are however some special considerations in order to deal with buses. It should be noted that a single bus link is not a valid configuration, since it does not provide full connectivity between the nodes on the bus topology. A bus link must be part of a multi-link configuration, which is a configuration with two or more links. On bus topologies, reverse flooding signals may be used to circulate messages from the nodes back to the master node. Reverse flooding may include sending a message on all interfaces that could possible lead to the master node. This may typically involves sending a message on all interfaces except for the interface on which the message was received. More particularly, the master node 282 may store the new_detect message 302 with the largest size it has seen so far in a variable, max_detect 304. When the new_detect message 302 is received by the master node, the master node compares the message 302 with the max_detect 304 in a comparison unit 306. If the size field in the new_detect message 302 is less than the size field in the max_detect 304, then a no-signal 308 is sent to an ignore unit 310. The unit 310 sends a comparison signal 312 to a comparison unit 314 that compares the time of detect (t) and compares it to a total allowable detect (T). If detect (t) is less than detect (T) then a yes-signal 316 is sent to a receiver 318 that may continue to receive new-detect messages from the nodes on the bus topology.

If detect (t) is not less than detect (T) then a no-signal 320 is sent by the comparison unit 314 to a process unit 322 to process max_detect 304. When a certain time-out period has expired, i.e. when detect (t) is no longer less than the maximum allowable detect (T), the master node processes max_detect 304 in the process unit 322. The idea behind this is that if the time-out period is sufficiently long, then max_detect will after that period contain the detect message generated by the last node 298 on the bus topology. In other words, the master node 282 has received all the detect messages and has complete topology information.

If the comparison unit 306 determines that new_detect is not less than max_detect then a yes-signal 324 is sent to a replace unit 326 that replaces the value of the max_detect 304 stored by the master node 282 with the new_detect 302 received.

The replace unit 326 sends a comparison signal 328 to a comparison unit 330 that, similar to the comparison unit 314, compares the time of detect (t) and compares it to a total allowable detect (T). If detect (t) is less than detect (T) then a yes-signal 332 is sent to a receiver 334 that may continue to receive new-detect messages from the nodes on the bus topology.

If detect (t) is not less than detect (T) then a no-signal 336 is sent by the comparison unit 330 to a process unit 338 to process max_detect 304. The unit 338 sends a comparison signal 340 to a comparison unit 342 that determines is the new_detect 302 was sent by the last node 298. If the new_detect 302 was sent by the last node 298, then a yes-signal 344 is sent to a set unit 346 that sets the bus topology to equal one to inform other nodes that the topology is a bus topology. If the new_detect 302 was not sent by the last node 298, then a no-signal 348 is sent to a set unit 350 to set the bus topology to equal zero to inform the other nodes that the bus topology is not a bus topology but a ring topology.

Figure 10:
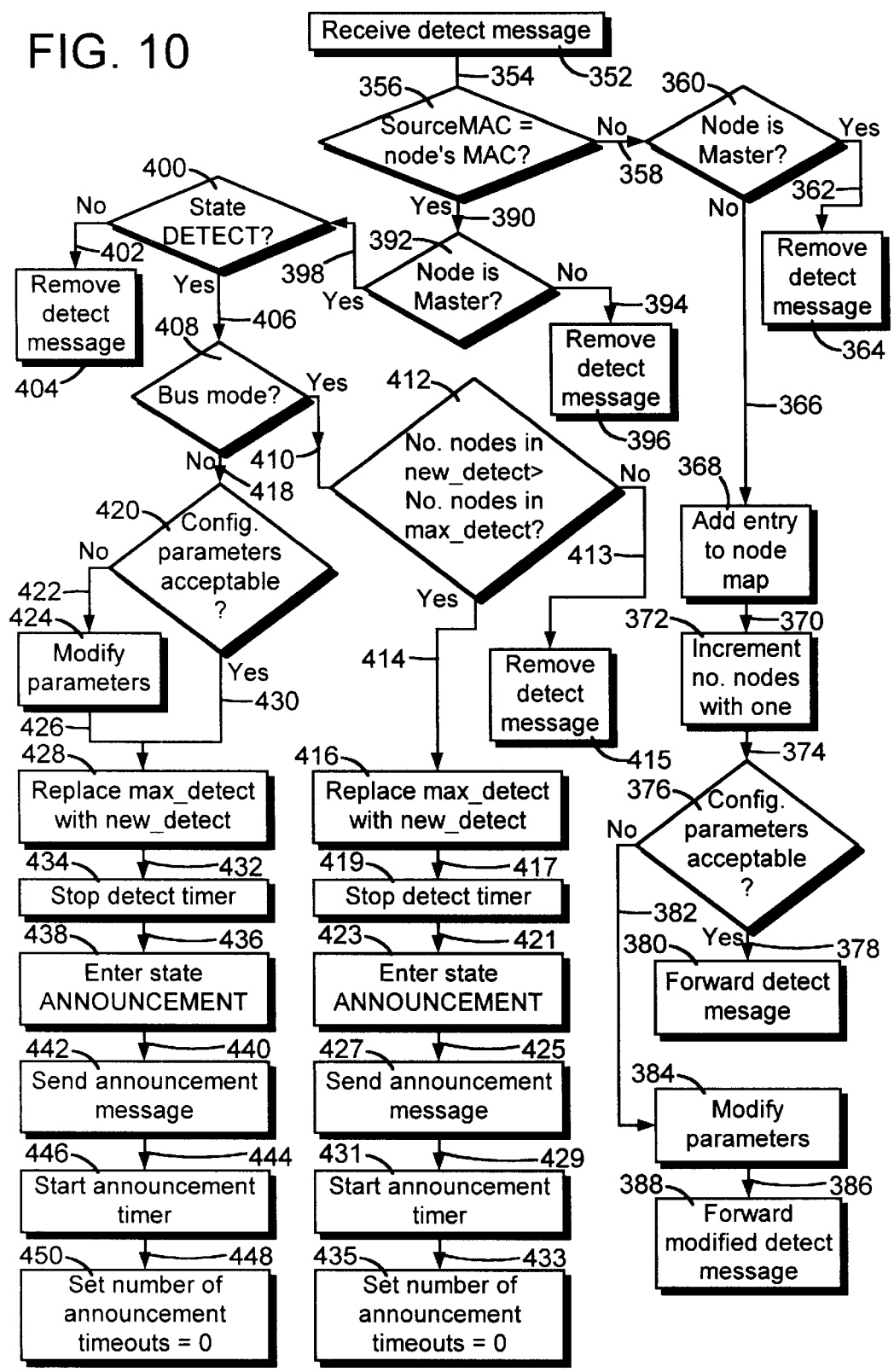
FIG. 10 is a schematic flow diagram for receiving a detect message.

FIG. 10 illustrates the procedure that takes place when a node receives a detect message in a detect message unit 352. The unit 352 sends a determination signal 354 to a comparison unit 356 that determines if the source MAC address is the same as the node's own MAC address. If not, the detect message 352 was sent by another node that is not a master node and the unit 356 sends a no-signal 358 to a comparison unit 360 that determines if the node that received the detect message 352 is a master node. If the unit 360 determines that the receiving node is a master node, then a yes-signal 362 is sent to a removal unit 364 to remove the unauthorized detect message from the topology. The detect message should not be transmitted by a node that is not a master node.

If the unit 360 determines that the receiving node is not a master node, then a no-signal 366 is sent to an addition unit 368 that adds the information of the detection message 352 to the node map 288, as shown in FIG. 8. The unit 368 sends an increment signal 370 to an increment unit 372 that increments the node number 290 with one increment. The unit 372 sends a comparison signal 374 to a comparison unit 376 that determines if the configuration parameters of the detect message 352 are acceptable to the node. If the configuration parameters are acceptable, then the comparison unit 376 sends a yes-signal 378 to a forwarding unit 380 that forwards the detect message 352 to the next node in the topology.

If the comparison unit 376 determines that the configuration parameters are not acceptable to the receiving node, then a no-signal 382 is sent to a modification unit 384 to modify the unacceptable parameters to be acceptable parameters to the receiving node. The modification unit 384 then sends a forwarding signal 386 to a forwarding unit 388 that forwards the modified detect message to the next node in the topology.

If the comparison unit 356 determines that the source MAC address is the same as receiving node's MAC address then the unit 356 sends a yes-signal 390 to a comparison unit 392. If the comparison unit 392 determines that the receiving node is not a master node, but the source MAC is identical to the receiving node's own MAC address, then a no-signal 394 is sent to a removal unit 396 that removes the detect message 352 from the topology because the detect message is likely to be flawed or belong to an earlier circulated detect message.

If the comparison unit 392 determines that the receiving node is a master node, then the units sends a yes-signal 398 to a state determination unit 400 that determines if the node is in state DETECT. If the node is not in state DETECT, then the unit 400 sends a no-signal 402 to a removal unit 404 that removes the detect message 352.

If the unit 400 determines that the master node is in state DETECT, then the unit sends a yes-signal 406 to a bus comparison unit 408. If the topology is a bus topology, then a yes-signal 410 is sent to a comparison unit 412 that compares if the number of nodes in the new_detect message is greater than the number of nodes in the max_detect. If new_detect has more nodes than max_detect, then the unit 412 sends a yes-signal 414 to a replacement unit 416 that replaces max_detect with new_detect. The details of the replacement unit and the timer considerations are described in detail in FIG. 9.

The replacement unit 416 sends a stop signal 417 to a timer unit 419 to stop the detect timer because the detect phase is complete since the number of nodes in new_detect is greater than the number of nodes in max_detect and the max_detect has been replaced with the new_detect. The unit 419 sends a state signal 421 to a state unit 423 so that the master node may enter state ANNOUNCEMENT and unit 423 sends a send signal 425 so that the sending unit 427 of the master node may send out the announcement message that includes the proposed parameters. The sending unit 427 then sends a start signal 429 to a timer 431 that starts the announcement timer. The timer 431 sends a set signal 433 to a set unit 435 that sets the number of announcement timeouts to equal zero.

If the comparison unit 412 determines that new_detect does not have more nodes than max_detect then a no-signal 413 is send to a remove unit 415 that removes the detect message because the master node is only interested in the detect message from the last node of the bus topology.

If the comparison unit 408 determines that it is not a bus topology, then the unit 408 sends a no-signal 418 to a comparison unit 420 that determines if the configuration parameters of the detect message 352 are acceptable to the master node. If the configuration parameters are unacceptable to the master node, then a no-signal 422 is sent to a modification unit 424 that modifies the configuration parameters so that the parameters are acceptable to the master node and sends a replace signal 426 to the replacement unit 428.

If the configuration parameters are acceptable, then the unit 420 sends a yes-signal 430 to the replacement unit 428 to replace max_detect with the new_detect. The replacement unit 428 sends a stop signal 432 to a timer unit 434 to stop the detect timer because the detect phase is complete since the source MAC was the master node's MAC in the unit 356 and the configuration parameters are acceptable to the master node.

The unit 434 sends a state signal 436 to a state unit 438 so that the master node may enter state ANNOUNCEMENT and unit 438 sends a send signal 440 so that the master node may send out the announcement message 442 that includes the proposed parameters. The sending unit 442 then sends a start signal 444 to a timer 446 that starts the announcement timer. The timer 446 sends a set signal 448 to a set unit 450 that sets the number of announcement timeouts to equal zero.

In the second detection phase, the master node may propagate the link topology information to the other nodes that are part of the same topology. This may be done by sending an announcement message to the nodes in the topology. The announcement message has the same fields as the detect messages, so the announcement message contains the link size and the complete node map. A node that receives the announcement message, updates its local topology information according to the announcement message, and forwards the announcement message. It should be noted that the announcement message preferably only contains valid topology information. So a node on a bus topology that receives the announcement message, may by examining the announcement message deduce whether or not the node is the last node on the bus topology, and decide whether to use reverse flooding and send back the information to the master node or forward the message downstream to the next node.

Figure 11:
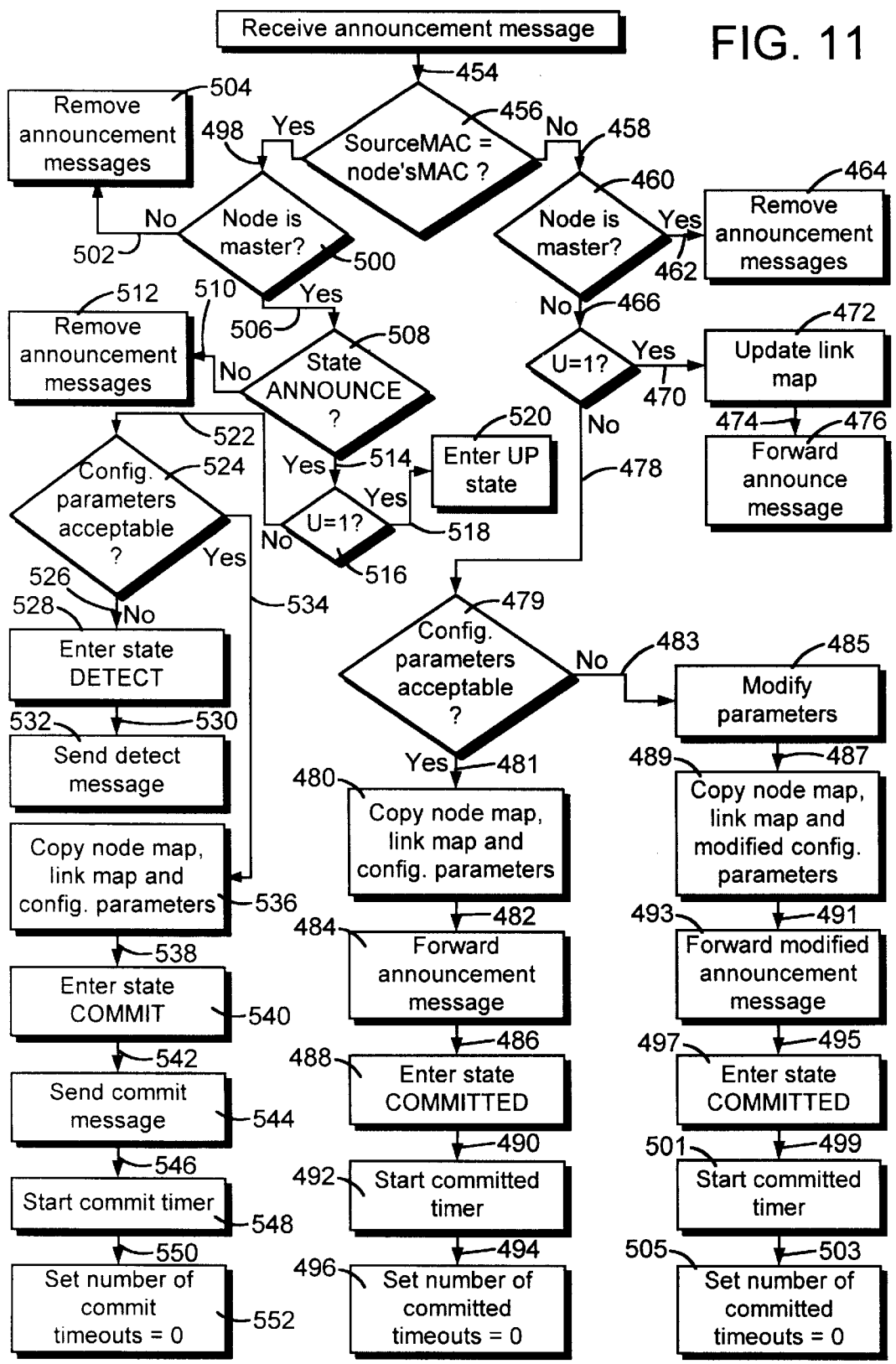
FIG. 11 is a schematic flow diagram for receiving an announcement message.

More particularly, FIG. 11 outlines the procedure when the announcement message is received by an announcement receiving unit 452 of a node. The unit 452 sends a comparison signal 454 to a comparison unit 456 that determines if the source MAC address is identical to the receiving node's own MAC address.

If the source MAC is not the same as the receiving node's MAC address then a no-signal 458 is sent to a comparison unit 460 that determines if the receiving node is a master node. If the receiving node is a master node, then the unit 460 sends a yes-signal 462 to a removal unit 464 that removes the announcement message from the topology because the announcement message was sent by a node that is not a master node.

If the comparison unit 460 determines that the receiving node is not a master node, then the unit 460 sends a no-signal 466 to a comparison unit 468 that determines if a U-flag is set to equal one. The U-flag is set to one if the announcement message is sent spontaneously by the master node and not as a result of the master node receiving a completed detect message. If the U-flag is set to one, then the unit 468 sends a yes-signal 470 to an update unit 472 that updates the link map and sends a forwarding signal 474 to a forwarding unit 476. The unit 476 sends the announcement message 452 to the next node in the topology.

If the U-flag is not set to one, then the unit 468 sends a no-signal 478 to a comparison unit 479 that determines if the configuration parameters are acceptable to the receiving node. There is a number of configuration parameters that can be varied on a DTM link, for example, the number of slots per cycle, slot allocation algorithm, MTU size, etc. Different nodes may have different capabilities in terms of the setting of these parameters. For example, one node may be able to hand a range of values for the number of slots per cycle, while another node could be hard wired for a single value.

In order to deal with this, and to make sure that the configuration parameters are consistent in all nodes, the LAP negotiates the configuration parameters with the nodes prior to the commit state is enter in order to determine a setting for the configuration parameters that is acceptable to all the nodes .

If the configuration parameters are acceptable, then the unit 479 sends a yes-signal 481 to a copying unit 480 that copies the node map, the link map and the configuration parameters of the announcement message 452 to the node and sends a forwarding message 482 to a forwarding unit 484 that forwards the announcement message 452 to the next node in the topology. The unit 484 sends a state signal 486 to a state unit 488 so that the node may enter state COMMITTED. The unit 488 sends a start signal 490 to a starter 492 that starts the committed timer which measure the time the node is in the committed state. The starter then sends a setting signal 494 to a set unit 496 that sets the number of committed timeouts to equal zero.

If the comparison unit 479 determines that the configuration parameters are not acceptable then the unit 479 sends a no-signal 483 to a modification unit 485 that modifies the parameters to a default setting of the parameters so that the parameters are acceptable to the receiving node. It is desirable to have pre-determined that the default setting of the configuration parameters are acceptable to all nodes in the topology so that the default parameters must be accepted by all the nodes including the master node.

The unit 485 then sends a copying signal 487 to a copying unit 489 that copies the node map, the link map and the modified default configuration parameters of the announcement message and sends a forwarding message 491 to a forwarding unit 493 that forwards the default announcement message to the next node in the topology. The unit 493 then sends a state signal 495 to a state unit 497 so that the node may enter state COMMITTED. The unit 497 sends a start signal 499 to a starter 501 that starts the committed timer which measure the time the node is in the committed state. The starter then may send a setting signal 503 to a set unit 505 that sets the number of committed timeouts to equal zero.

When the master node receives the default message, it is contemplated to require the master node to re-transmit the default announcement message around the entire topology so that all the nodes must switch the configuration setting to the default configuration parameters.

If the comparison unit 456 determines that the source MAC address is identical to the node's MAC address then the unit 456 sends a yes-signal 498 to a comparison unit 500 that determines if the node is a master node. If the unit 500 determines that the receiving node is not a master node then the unit 500 sends a no-signal 502 to a removal unit 504 that removes the announcement message 452 from the topology because the announcement message was sent by an unauthorized node that is not a master node. In the alternative, the receiving node used to be the master node, which explains why the source MAC address was identical to the node's own MAC address in the unit 456, but, in the meantime, another node has been dynamically assigned to be the master node. This means only announcement messages that are sent by the new master node should be considered by the nodes in the ring topology.

If the comparison unit 500 determines that the receiving node is a master node, then the unit 500 sends a yes-signal 506 to a comparison unit 508. If the master node is not in state ANNOUNCE, then the unit 508 sends a no-signal 510 to a removal unit 512 because the announcement message 452 should not have been transmitted by the master node without the master node itself being in state ANNOUNCE. Alternatively, the announcement timer has expired while the announcement message 452 was being circulated in the topology or there was a timeout and the announcement message 452 was the re-transmitted second announcement message that should be ignored since the first announcement message has already been received and processed so that the master node has changed to be in the UP state. The announcement messages should only be received and processed once. The reason why the master node goes to UP state and not COMMIT state is that the U-flag is set to one as a result of the timeout event.

If the master node is in state ANNOUNCE, then the unit 508 sends a yes-signal 514 to a determination unit 516 that determines if the U-flag is set to one. The master node may spontaneously sent an announcement message to the other nodes to control that all the nodes are still part of the topology; that all the links are working; and that it is still possible to send messages around the topology. In this case, there is no need to send additional messages to the nodes, because it is just the master node that is controlling the topology and the master node may go right to the state UP.

If the U-flag is set to one then the unit 516 sends a yes-signal 518 to an activation unit 520 so that the master node may enter the UP state and the master node is ready to transfer data in the topology.

If the unit 516 determines that the U-flag is not set to one, which means that the announcement message is a result of the master node receiving the detect message back, then the unit 516 sends a no-signal 522 to a comparison unit 524 that determines if the configuration parameters are acceptable to the master node. The configuration parameters may have been changed by one or many nodes when the detect message was circulated through the nodes.

If the unit 524 determines that the configuration parameters are not acceptable to the master node, then the unit 524 sends a no-signal 526 to a state unit 528 so that the master node may enter state DETECT. The state unit 528 sends a start signal 530 to a sending unit 532 of the master node that sends a new detect message to gather information about nodes in the ring and to try to get the configuration parameters acceptable by all the nodes. For example, the master node may find out if there is a node and which node in the topology that modifies the configuration parameters to an unacceptable setting.

If the configuration parameters are acceptable, then the unit 524 sends a yes-signal 534 to a copying unit 536 that copies the node map, the link map and the configuration parameters of the announcement message 452 to the master node and sends a state signal 538 to a state unit 540 so that the master node may enter state COMMIT. The unit 540 sends a send signal 542 to a sending unit 544 that sends a commit message to the nodes in the topology. The unit 544 sends a start signal 546 to a starter 548 that starts the commit timer which measure the time the master node is in the commit state. The starter then sends a setting signal 550 to a set unit 552 that set the number of commit timeouts to equal zero.

When the announcement message 452 has circulated around the entire topology, and reached the master node again, all the nodes on the link have knowledge about the current configuration and all the nodes have accepted the configuration parameters. Therefore, the commit message may not include any configuration parameters. However, while the announcement message is sent around the ring, different nodes could have different views on the current configuration. Therefore it is important that a node in the topology does not apply the new configuration parameters before the information has reached all the nodes In the third commit phase, the master node may send the commit message 544, instructing the nodes on the ring to switch over to the new configuration that has been approved by all the nodes. In the period between receiving the announcement message 452 and the commit message 544, the nodes in the topology may not perform any actions that require up-to-date information about the topology. For example, the nodes may not open new channels or participate in slot reallocation during this period. This avoids problems due to link topology inconsistencies and guarantees that the correct operation of the link also during reconfiguration.

As in the case of the announcement message 452, the topology is known by the nodes during the processing of the commit message 544. In other words, a node on a bus topology either forwards the message downstream or performs reverse flooding, depending on the node's position on the bus topology.

There is a number of link configuration parameters that need to be consistent between all nodes on a link. These parameters may, for example, be set through network management or are given by the hardware capabilities. Currently supported parameters may include the number of slots per cycle. Possible values may be in the range from zero to the maximum number of slots on the physical medium. Another parameter is the slot reallocation. Possible values of the slot reallocation may include an enabled status and a disabled status. The initial slot distribution is another parameter. The possible values may include a centralized status and a distributed status. As indicated above, the present protocol supports slot reuse. The possible values may include an enabled status and a disable status. The maximum message size for each link level encapsulation may be a parameters that vary in the range from 0 to 2048 bytes.

Different nodes may have different capabilities. For example, one node may be hard-wired for a certain number of slots per cycle, while another node could be capable of dealing with a range of values. It is the responsibility of the LAP to make sure that the nodes have consistent link configuration parameter settings. This may be performed in a two-phase negotiation between the nodes in the topology. In the first phase, the master node may suggest a tentative parameter setting (typically the default values). The tentative setting may be included in the detect message. A node that receives a detect message may check the tentative setting, and if some parameters values are not acceptable to the node, the node may modify those values before the node forwards the detect message to the next node in the same topology. When the detect message arrives to the master node, the master node may first verify that the values are acceptable to the master node, and the master node may modify parameters that have unacceptable settings, if any. Then the master node may use the setting as the proposed setting for the entire link.

In a second phase, the master node distribute the proposed setting to the nodes on the link. The proposed setting may be included in announcement messages. It may happen that the proposed setting is unacceptable to some nodes on the link, which is an indication that the link is inconsistently configured. To detect this, each parameter in the proposed setting has a reject flag associated with it. The reject flag is initially cleared by the master node. A node, that discovers a parameter in the proposed setting that has an unacceptable value, may set the corresponding reject flag. This setting will invalidate the entire proposed setting, so that a node that receives a proposed setting where some parameter has the reject flag set, ignores the entire setting.

If no reject flag is set when the proposed setting reaches the master node, the configuration has succeeded and the master node may proceed to the next phase of the LAP by sending a commit message. Otherwise the master node reports an error and does not proceed with the sending of the commit message.

Figure 12:
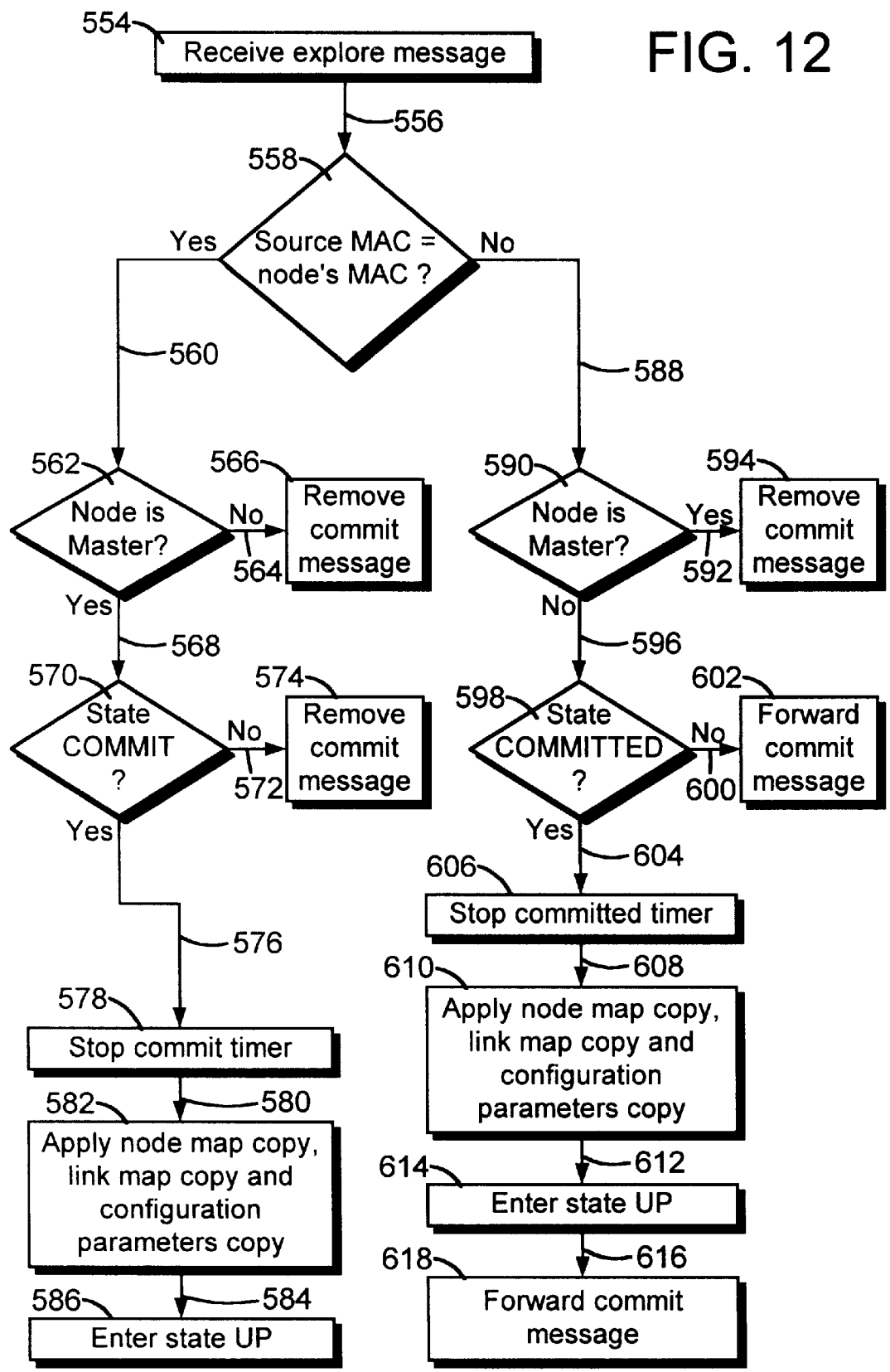
FIG. 12 is a schematic flow diagram for receiving a commit message.

With reference to FIG. 12, when a receiver unit 554 of a node receives the commit message, the unit 554 sends a comparison signal 556 to a comparison unit 558 that compares if the source MAC address of the commit message is the same as the receiving node's own MAC address.

If the comparison unit 558 determines that the source MAC address is identical to the receiving node's MAC address then the unit 558 sends a yes-signal 560 to a comparison unit 562 that determines if the node is a master node. If the unit 562 determines that the receiving node is not a master node then the unit 562 sends a no-signal 564 to a removal unit 566 that removes the commit message 554 from the topology because the commit message was sent by an unauthorized node that is not a master node. In the alternative, the receiving node used to be the master node, which explains why the source MAC address was identical to the node's own MAC address in the unit 558, but, in the meantime, another node was dynamically assigned to be the master node. This may mean only commit messages that are sent by the new master node should be considered by the nodes in the topology.

If the comparison unit 562 determines that the receiving node is the master node, then the unit 562 sends a yes-signal 568 to a comparison unit 570. If the master node is not in state COMMIT, then the unit 570 sends a no-signal 572 to a removal unit 574 because the commit message 554 should not have been transmitted by the master node without the master node being in state COMMIT. Alternatively, the commit timer has expired while the commit message 554 was being circulated in the topology or there was a timeout and a second commit message 554 was the re-transmitted so that the second commit message should be ignored if the first commit message has already been received and processed so that the master node has changed to be in the UP state and ready to transmit and receive payload information.

If the master node is in state COMMIT, then the unit 570 sends a yes-signal 576 to a timer unit 578 that stops the commit timer and sends an apply signal 580 to an apply unit 582 that applies the node map copy, the link map copy and the configuration parameters copy as the current node map, link map and configuration parameters, respectively, in the master node. This information was earlier copied in the copying unit 536 during the process of receiving the announcement message 452. The apply unit 582 then sends a state signal 584 to a state unit 586 so that the master node may enter state UP and be ready to transmit data on the topology.

If the comparison unit 558 determines that the source MAC address is not identical to the receiving node's MAC address then the unit 558 sends a no-signal 588 to a comparison unit 590 that determines if the node is a master node. If the unit 590 determines that the receiving node is a master node then the unit 590 sends a yes-signal 592 to a removal unit 594 that removes the commit message 554 from the topology because the commit message was sent by an unauthorized node that is not or is no longer a master node.

If the comparison unit 590 determines that the receiving node is not the master node, then the unit 590 sends a no-signal 596 to a comparison unit 598. If the master node is not in state COMMIT, then the unit 598 sends a no-signal 600 to a forwarding unit 602 to forward the commit message to the next node in the topology because the receiving node is not ready to receive the commit message or is in an inactive state so that the commit message cannot be received by the node.

If the master node is in state COMMIT, then the unit 598 sends a yes-signal 604 to a timer unit 606 that stops the committed timer and sends an apply signal 608 to an apply unit 610 that applies the node map copy, the link map copy and the configuration parameters copy and the current node map, link map and configuration parameters, respectively, in the receiving node. This information was earlier copied in the copying unit 480 during the process of receiving the announcement message 452. The apply unit 610 then sends a state signal 612 to a state unit 614 so that the receiving node may enter state UP and be ready to receive and transmit data on the topology. The unit 614 then sends a forwarding signal 616 to a forwarding unit 618 that forwards the commit message 554 to the next node in the topology.

Figure 13:
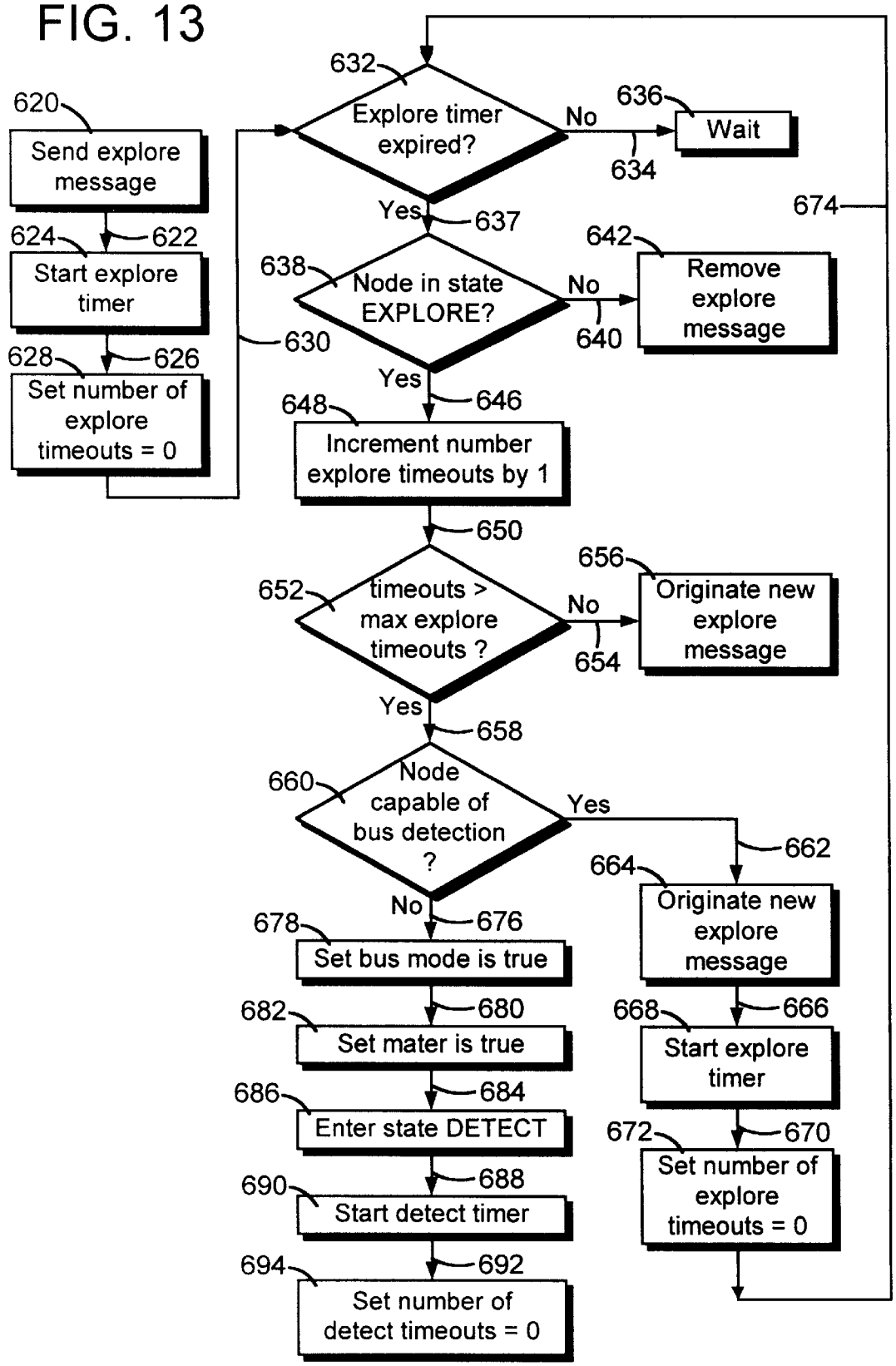
FIG. 13 is a schematic flow diagram for originating an explore message.

FIG. 13 shows a detailed schematic flow diagram that is related to the explore timer that is associated with the sending of an explore message. When a sender unit 620 sends an explore message, a start signal 622 is sent to an explore timer 624 that starts the explore timer. The explore timer 624 sends a set signal 626 to a setting unit 628 that sets the number of explore timeouts to equal zero. The unit 628 sends an exploration signal 630 to a comparison unit 632 that determines if the explore timer has expired. If the explore timer is less than a certain expiration value, then the unit 632 sends a no-signal 634 to a wait unit 636 so that the system will wait to receive more explore messages because the timer has not expired.

If the explore timer has expired, then the comparison unit 632 sends a yes-signal 634 to a status unit 636 that checks whether the status of the node is in EXPLORE mode. If the unit 638 determines that the node is not in EXPLORE mode, then a no-signal 640 is sent to a remove unit 642 that removes the explore message from the system. If the unit 638 determines that the node is in EXPLORE mode then the unit sends a yes-signal 646 to an increment unit 648 that increments the number of timeouts by one integer and sends a comparison signal 650 to a comparison unit 652. The unit 652 compares if the number of timeouts is greater than a maximum number of allowable timeouts.

If the unit 652 determines that the number of timeouts is not greater than the maximum number of timeouts then a no-signal 654 is sent to a origination unit 656 to instruct the unit 656 to originate a new explore message. If the unit 652 determines that the number of timeout is greater that the maximum number of explore timeouts then the unit 652 sends a yes-signal 658 to a comparison unit 660. In practice, this may mean that the node is sending explore messages but receives no answer from the other nodes until the explore timer reaches the maximum allowable time period.

The unit 660 determines if the node is capable of bus detection. If the node is capable of bus detection then the unit sends a yes-signal 662 to an origination unit 664 that originates a new explore message into the node system since the node is not receiving any response to its earlier transmitted explore message so that the node will keep on sending explore message until it receives a response. The reason why the node does not receive a response could be that another is not functioning properly or there is a break or another malfunction in the topology. The node could be designed so that the node will eventually send a failure message if the node gets into an eternal loop.

After receiving the yes-signal 662, the unit 664 sends start signal 666 to an explore timer 668 that start the explore timer and sends a set signal 670 to a setting unit 672 that sets the number of explore timeouts to zero. The unit 672 may then send a comparison signal 674 back to the comparison unit 632 that iterates the loop described above.

If the unit 660 determines that the node is not capable of bus detection then the unit 660 sends a no-signal 676 to a setting unit 678 that set bus mode as being true. The unit 678 sends a setting signal 680 to a master setting unit 682 that sets the node to become a master node since the node does not know and cannot determine if the node is the first node in a bus topology. This is particularly useful if there is a break or failure upstream of the node so that the node automatically become the first node is a bus topology. The unit 682 then sends an entering signal 684 to a enter unit 686 that enter the node in the DETECT mode and sends a starter signal 688 to a detect timer 690 that starts the detect timer. The timer 690 sends a setting signal 692 to a setting unit 694 that sets the number of detect timeouts to zero.

Figure 14:
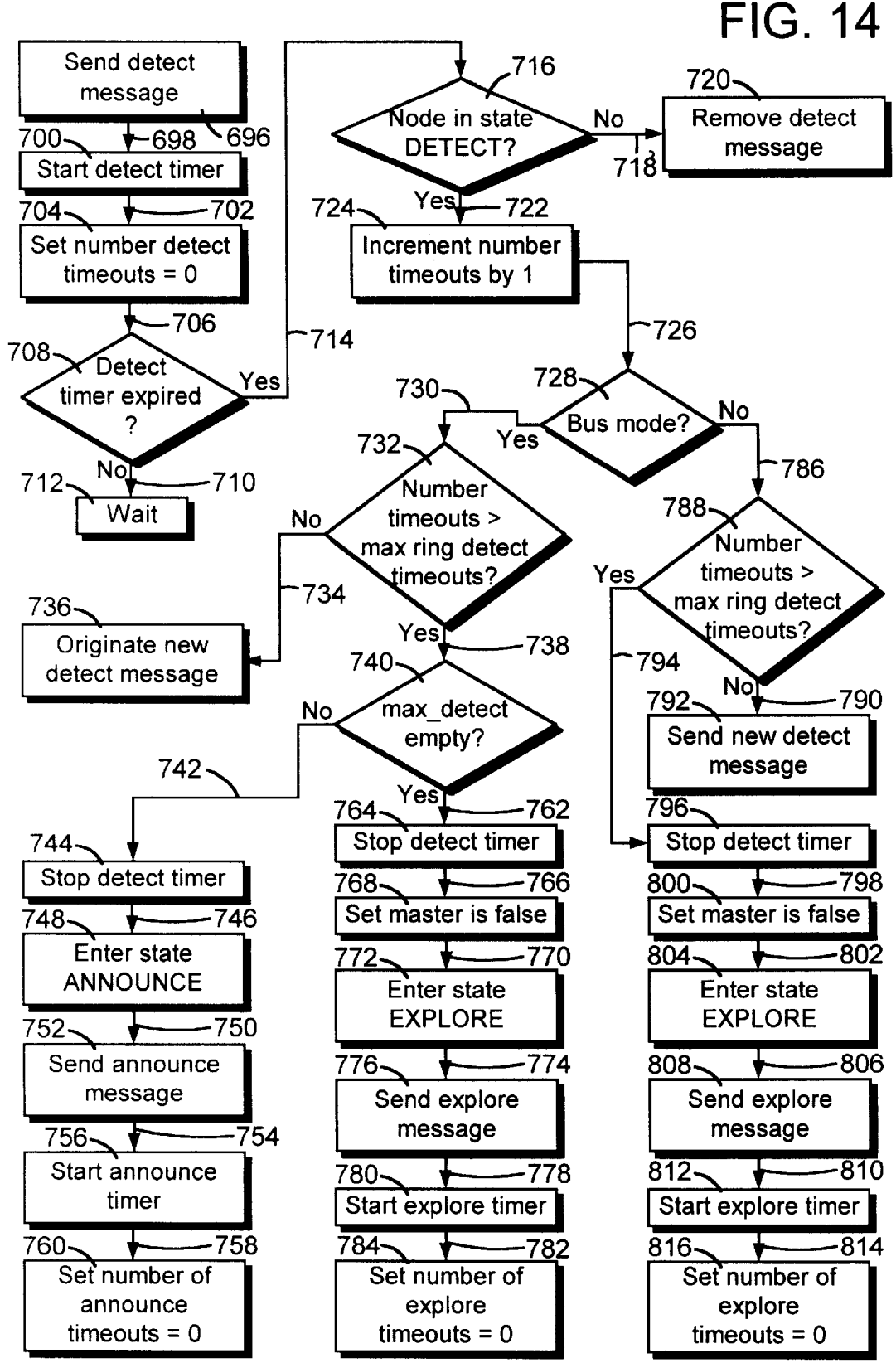
FIG. 14 is a schematic flow diagram for originating a detect message.

FIG. 14 shows a detailed schematic flow diagram that are related to the detect timer that is associated with the sending of a detect message. When a sender unit 696 sends a detect message, the unit 696 also sends a starter signal 698 to a detect timer 700 that starts a detect timer. The timer 700 sends a setting signal 702 to a setting unit 704 that set the number of detect timeouts equal to zero. The setting unit 704 sends a detect signal 706 to a comparison unit 708 that determines if the detect timer has expired.

If the unit 708 determines that the detect timer has not expired then the unit 708 sends a no-signal 710 to a wait unit 712 to wait for more detect signals to arrive. If the unit 708 determines that the detect timer has expired, then the unit 708 sends a yes-signal 714 to a comparison unit 716 that determines if the node is in state DETECT. If the node is not in state DETECT, the unit 716 sends a no-signal 718 to a remove unit 720 that removes the detect message that was sent by the sending unit 696. If the node is in state DETECT then the comparison unit 716 sends a yes-signal 718 to an increment unit 724 that increments the number of detect timeouts with one integer. The unit 724 sends a comparison signal 726 to a comparison unit 728 that determines if the node is in a bus mode or not. If the unit 728 is in a bus mode then the unit 728 sends a yes-signal 730 to a comparison unit 732 that determines if the number of detect timeouts is greater than a maximum number of bus detect timeouts. If the number of detect timeouts is greater then the comparison unit 732 sends a no-signal 734 to a sending unit 736 to instruct the unit 736 to send another detect message. If the number of detect timeouts is not greater then the comparison unit 732 sends a yes-signal 738 to a comparison unit 740 that determines if the max_detect PDU register is empty.

If the max_detect register is not empty, the unit 740 may send a no-signal 742 to a timer 744 that stops the detect timer. The timer 744 sends an enter signal 746 to an enter unit 748 that enters the node to state ANNOUNCE. The unit 748 sends a sending signal 750 to a sending unit 752 that sends a new announcement message. The unit 752 then sends a start signal 754 to a timer 756 that starts the announcement timer. The timer 756 sends a setting signal 758 to a setting unit 760 that sets the number of announcement timeouts to equal zero.

If the max_detect register is empty, as determined by the comparison unit 740, then the unit 740 sends a yes-signal 762 to a timer 764 that stops the detect timer. The timer 764 sends a setting signal 766 to a setting unit 768 that sets the master as being false, i.e. the node is not the master. The setting unit 768 then sends an enter signal 770 to an enter unit 772 that enters the node to state EXPLORE because no response from the detect messages have been received. The unit 772 sends a sending signal 774 to a sending unit 776 that sends a start signal 778 to a timer 780 that starts the explore timer. The timer 780 then sends a setting signal 782 to a setting unit 784 that sets the number of explore timeouts to equal zero.

If the comparison unit 728 determines that the node is not in a bus mode, then the unit 728 sends a no-signal 786 to a comparison unit 788 that determines if the number of detect timeouts is greater than a maximum number of ring detect timeouts. If the unit 788 determines that the number of detect timeouts is not greater then the unit 788 sends a no-signal 790 to a sending unit 792 that sends a new detect message since there is still time to send detect messages.

If the comparison unit 788 determines that the number of timeouts is greater than the maximum allowable ring detect timeouts then the unit 788 sends a yes-signal 794 to a timer 796 that stops the detect timer. The timer 796 sends a setting signal 798 to a setting unit 800 that sets the master as being false, i.e. the node is not the master. The setting unit 800 then sends an enter signal 802 to an enter unit 804 that enters the node to state EXPLORE because no response from the detect messages have been received. The unit 804 sends a sending signal 806 to a sending unit 808 that sends a start signal 810 to a timer 812 that starts the explore timer. The timer 812 then sends a setting signal 814 to a setting unit 816 that sets the number of explore timeouts to equal zero.

While the present invention has been described with reference to preferred embodiments, it is to be understood that certain substitutions and alterations may be made thereto without departing from the spirit and scope of the invention as set forth in the appended claims.

We claim:

1. A method for automatic configuration of a dynamic synchronous transfer mode network, comprising:
   (a) providing a dynamic synchronous transfer mode network having a first node, a second node and a third node for receiving and transmitting frames, the network using time division multiplexing of time cycles that are dividable into tile slots, the nodes being changeable into a detect mode for detecting the nodes in the network, an announce mode for informing the nodes in the network and a commit mode for committing the nodes to configuration parameters;
   (b) the nodes selecting the first node as a master node;
   (c) the master node transmitting a first detect signal to the second and the third node to inform the second and the third nodes about a number of nodes and addresses of the nodes in the network;
   (d) the second node comparing the first detect signal to a stored detect signal;
   (e) the second node replacing the stored detect signal with the first detect signal when the first detect signal has an incremental value that is greater than an incremental value of the stored detect signal;
   (f) the second node forwarding the first detect signal to the third node, the third node forwarding the first detect signal to the master node;
   (g) the master node receiving the first detect signal;
   (h) the master node transmitting an announce signal to the second node, the announce signal comprising first configuration parameters;
   (i) the second node receiving the announce signal;
   (j) the second node comparing the first configuration parameters with stored configuration parameters to determine if the first configuration parameters are acceptable;
   (k) the second node modifying the first configuration parameters when the first configuration parameters are unacceptable, the second node forwarding the announce signal comprising the modified first configuration parameters to the third node;
   (l) the second node replacing the stored configuration parameters with the first configuration parameters when the first configuration parameters are acceptable, the second node forwarding the announce signal comprising the first configuration parameters to the third node;
   (m) the third node receiving the announce signal from the second node, the third node forwarding the announce signal to the master node;
   (n) the master node receiving the announce signal;
   (o) the master node determining if the first modified configuration parameters are acceptable when the announce signal comprises the first modified configuration parameters;
   (p) the master node sending a commit signal to the second node, the commit signal comprising the first configuration parameters when the announce signal received by the master node comprises the first configuration parameters, the commit signal comprising the modified first canfiguration parameters when the announce signal received by the master node comprises the modified first configuration parameters and the first configuration parameters are acceptable to the master node;
   (q) the second node receiving the commit signal;
   (r) the second node applying the first configuration parameters when the commit signal comprises the first configuration parameters; and
   (s) the second node applying the first modified configuration parameters when the commit signal comprises the first modified configuration parameters.

2. The method of claim 1 wherein step (c) further comprises the nodes incrementing a counter in a node map of the detect signal.

3. The method of claim 1 wherein step (g) further comprises the step of the master node receiving the first detect signal that has detection configuration parameters and the master node determines if the detection configuration parameters are acceptable, the master node replacing a set of stored configuration parameters with the detection configuration parameters.

4. The method of claim 1 wherein step (h) further comprises the master node starting an announcement timer and setting a number of announcement timeouts to zero.

5. The method of claim 1 wherein step (o) further comprises the master node sending a second detect signal when the first modified configuration parameters are unacceptable.

6. The method of claim 1 wherein step (o) further comprises the master node copying a node map and the first modified configuration parameters of the announce signal when the first modified configuration parameters are acceptable.

7. The method of claim 1 wherein the method further comprises the master node receiving the commit signal and the master node entering an operational payload state to prepare for transmitting and receiving payload information.

* * * * *